(12) United States Patent
Anderson et al.

(10) Patent No.: US 8,989,523 B2
(45) Date of Patent: Mar. 24, 2015

(54) LIQUID CRYSTAL WAVEGUIDE FOR DYNAMICALLY CONTROLLING POLARIZED LIGHT

(75) Inventors: Michael H. Anderson, Lyons, CO (US); Scott D. Rommel, Lakewood, CO (US); Scott R. Davis, Denver, CO (US)

(73) Assignee: Vescent Photonics, Inc., Golden, CO (US)

( * ) Notice: Subject to any disclaimer, the term of this patent is extended or adjusted under 35 U.S.C. 154(b) by 41 days.

(21) Appl. No.: 13/361,599

(22) Filed: Jan. 30, 2012

(65) Prior Publication Data
US 2012/0269478 A1 Oct. 25, 2012

Related U.S. Application Data

(63) Continuation-in-part of application No. 10/963,946, filed on Oct. 12, 2004, now abandoned.

(60) Provisional application No. 60/539,030, filed on Jan. 22, 2004.

(51) Int. Cl.
*G02F 1/035* (2006.01)
*G02F 1/295* (2006.01)
*G02F 1/1337* (2006.01)

(52) U.S. Cl.
CPC .... *G02F 1/295* (2013.01); *G02F 2001/133757* (2013.01)
USPC .................................................. 385/3

(58) Field of Classification Search
USPC .................................................. 385/3
See application file for complete search history.

(56) References Cited

U.S. PATENT DOCUMENTS

| | | | |
|---|---|---|---|
| 3,963,310 A | 6/1976 | Giallorenzi et al. |
| 4,006,967 A | 2/1977 | Kenan et al. |
| 4,737,014 A | 4/1988 | Green |
| 4,896,325 A | 1/1990 | Coldren |

(Continued)

FOREIGN PATENT DOCUMENTS

| | | |
|---|---|---|
| EP | 1186940 | 3/2002 |
| JP | 59052219 | 3/1984 |
| JP | 63244004 | 10/1988 |

OTHER PUBLICATIONS

Crystech "BBO", obtained from http://www.ilphotonics.com/cdv2/CrystechCrystalsOptics/CrystalsCrystech/Non_Linear_Crystals/BBO.pdf on Jun. 17, 2013.

(Continued)

*Primary Examiner* — Timothy L Rude
(74) *Attorney, Agent, or Firm* — Trenner Law Firm, LLC; Mark D. Trenner

(57) ABSTRACT

Waveguide and associated methods for controlling an optical phase delay (OPD) of TE polarized light traveling along a propagation direction through a waveguide are disclosed. In one example, the method includes providing the waveguide with a core, at least one cladding; initially aligning at least a portion of the liquid crystal molecules in an initial orientation with their longitudinal axes oriented at an out-of-plane tilt angle, and their longitudinal axis oriented at an in-plane angle; providing the waveguide with a pair of electrodes for receiving a control signal; and applying the control signal to the pair of electrodes to rotate the liquid crystal molecules from the initial orientation, thereby controlling the optical phase delay of the TE polarized light traveling through the waveguide.

11 Claims, 18 Drawing Sheets

(56) References Cited

U.S. PATENT DOCUMENTS

| | | |
|---|---|---|
| 5,044,712 A | 9/1991 | Soref |
| 5,132,079 A | 7/1992 | Stewart et al. |
| 5,255,112 A | 10/1993 | Hori et al. |
| 5,291,567 A | 3/1994 | Revelli, Jr. et al. |
| 5,301,201 A | 4/1994 | Dutta et al. |
| 5,317,446 A | 5/1994 | Mir et al. |
| 5,319,668 A | 6/1994 | Luecke |
| 5,347,377 A * | 9/1994 | Revelli, Jr. et al. ........... 349/193 |
| 5,388,169 A | 2/1995 | Kobayashi et al. |
| 5,499,256 A | 3/1996 | Bischel et al. |
| 5,504,772 A | 4/1996 | Deacon et al. |
| 5,513,196 A | 4/1996 | Bischel et al. |
| 5,596,671 A | 1/1997 | Rockwell, III |
| 5,766,974 A | 6/1998 | Sardella et al. |
| 5,789,776 A | 8/1998 | Lancaster et al. |
| 5,837,613 A | 11/1998 | Kalnitsky et al. |
| 5,965,691 A | 10/1999 | Gibbons et al. |
| 6,041,071 A | 3/2000 | Tayebati |
| 6,178,035 B1 | 1/2001 | Eda et al. |
| 6,205,159 B1 | 3/2001 | Sesko et al. |
| 6,215,928 B1 | 4/2001 | Friesem et al. |
| 6,324,204 B1 | 11/2001 | Deacon |
| 6,330,388 B1 | 12/2001 | Bendett et al. |
| 6,373,872 B2 | 4/2002 | Deacon |
| 6,449,084 B1 | 9/2002 | Guo |
| 6,470,036 B1 | 10/2002 | Bailey et al. |
| 6,480,513 B1 | 11/2002 | Kapany et al. |
| 6,546,163 B2 | 4/2003 | Thackara |
| 6,559,921 B1 | 5/2003 | Leslie et al. |
| 6,594,408 B1 | 7/2003 | Noe |
| 6,603,902 B1 | 8/2003 | So |
| 6,608,952 B2 | 8/2003 | Eggleton et al. |
| 6,650,822 B1 | 11/2003 | Zhou |
| 6,661,936 B2 | 12/2003 | Noe |
| 6,763,047 B2 | 7/2004 | Daiber et al. |
| 6,768,856 B2 | 7/2004 | Akwani et al. |
| 6,813,417 B2 | 11/2004 | Oh et al. |
| 6,816,140 B2 | 11/2004 | Fujieda |
| 6,816,516 B2 | 11/2004 | Daiber |
| 6,853,654 B2 | 2/2005 | McDonald et al. |
| 6,859,567 B2 | 2/2005 | Galstian et al. |
| 6,859,572 B2 | 2/2005 | Ishibashi |
| 6,920,159 B2 | 7/2005 | Sidorin et al. |
| 7,079,724 B2 | 7/2006 | Thackara |
| 7,315,665 B1 | 1/2008 | Anderson |
| 7,403,678 B2 | 7/2008 | Thapliya et al. |
| 7,570,320 B1 | 8/2009 | Anderson et al. |
| 8,311,372 B2 | 11/2012 | Anderson et al. |
| 2001/0033400 A1 | 10/2001 | Sutherland et al. |
| 2002/0031299 A1 | 3/2002 | Hatakoshi |
| 2002/0041412 A1 | 4/2002 | Hajjar et al. |
| 2002/0041726 A1 | 4/2002 | Thackara |
| 2002/0131694 A1 | 9/2002 | So et al. |
| 2002/0140879 A1 | 10/2002 | Fujieda |
| 2002/0150362 A1 | 10/2002 | Gutin et al. |
| 2002/0154878 A1 | 10/2002 | Akwani et al. |
| 2002/0181880 A1 | 12/2002 | Dautartas et al. |
| 2003/0048817 A1 | 3/2003 | Steffens et al. |
| 2003/0059148 A1 | 3/2003 | Nishizawa et al. |
| 2003/0086448 A1 | 5/2003 | Deacon |
| 2003/0103708 A1 | 6/2003 | Galstian et al. |
| 2003/0108273 A1 | 6/2003 | Kowalczyk et al. |
| 2003/0137999 A1 | 7/2003 | Spiegelberg et al. |
| 2003/0142262 A1 | 7/2003 | Leslie et al. |
| 2003/0169958 A1 | 9/2003 | Ridgway et al. |
| 2003/0214059 A1 | 11/2003 | Itoh |
| 2003/0214700 A1 | 11/2003 | Sidorin et al. |
| 2003/0219197 A1 | 11/2003 | Kawamoto |
| 2003/0231279 A1 | 12/2003 | Wessel et al. |
| 2004/0057475 A1 | 3/2004 | Frankel et al. |
| 2004/0129949 A1 | 7/2004 | Deliwala et al. |
| 2004/0208412 A1 | 10/2004 | Miyazaki et al. |
| 2004/0264902 A1 | 12/2004 | Zoorob et al. |
| 2005/0047739 A1 * | 3/2005 | Parker et al. .................. 385/122 |
| 2005/0135439 A1 | 6/2005 | Chapman et al. |
| 2005/0180713 A1 | 8/2005 | Heideman et al. |
| 2005/0265403 A1 | 12/2005 | Anderson et al. |
| 2005/0271325 A1 | 12/2005 | Anderson et al. |
| 2008/0008413 A1 | 1/2008 | Anderson |
| 2008/0008414 A1 | 1/2008 | Anderson et al. |
| 2008/0013587 A1 | 1/2008 | Tempea et al. |
| 2008/0161648 A1 | 7/2008 | Karasawa |
| 2009/0003841 A1 | 1/2009 | Ghidini et al. |
| 2012/0269478 A1 | 10/2012 | Anderson et al. |

OTHER PUBLICATIONS

Almaz Optics Potassium Titanyl Phosphate (KTP), obtained from http://www.almazoptics.com/KTP.htm on Jun. 17, 2013.

Precision Micro-Optics "Optical Grade Silicon Wafers," Feb. 19, 2010, obtained from http://www.pmoptics.com/files/Optical_Silicone_wafer.pdf on Jun. 18, 2013.

International Search Report for Int. Application No. PCT/US2005/001758 dated Aug. 31, 2006, 2 pages.

Written Opinion for Int. Application No. PCT/US2005/001758 dated Aug. 31, 2006, 3 pages.

International Search Report for Int. Application No. PCT/US2005/001586 dated Sep. 21, 2006, 3 pages.

Written Opinion for Int. Application No. PCT/US2005/001586 dated Sep. 21, 2006, 3 pages.

Desmat, et al., "Silicon-on-Insulator Optical Waveguides with Liquid Crystal Cladding for Switching and Tuning", Proceedings of the European Conference on Optical Communication (ECOC) 2003, vol. 3, (2003), p. 430-431.

Mormile, et al., "A Basic Element for Integrated Electro-Optical Devices Based on Liquid Crystal Waveguides", Proc. SPIE 4078, (2000), p. 779-785.

Kobayashi, et al., "2x2 Optical Waveguide Matrix Switch Using Nematic Liquid Crystal", IEEE Journal of Quantum Electronics, vol. QE-18, No. 10, 1982.

Casson, et al., "Near-IR Turnable Laser with an Integrated LiTaO3 Electro-Optic Deflector", Applied Optics, vol. 41, No. 30, Oct. 20, 2002.

Hermann, "Integrated Optics with Liquid Crystals", University of Technology, 2000.

Clark, et al., "Surface-Stabilized Ferroelectric Liquid-Crystal Electro-Optic Waveguide Switch", Applied Physics Letter 57(18), Oct. 29, 1990.

Coppola, et al., "Optoelectronic Router in Glass Waveguide with a Liquid Crystal Cladding", SPIE, vol. 4829, 2003.

Gialorenzi, et al., "Lighting Scattering from Smectic Liquid-Crystal Waveguides", Journal of Applied Physics, vol. 47, No. 5, May 1976.

Karpierz, "Nonlinear Properties of Waveguides with Twisted Nematic Liquid Crystal", Acta Physica Polonica A, vol. 99, 161-176, 2001.

Maune, et al., "Electronically Tunable Ring Resonators Incorporating Nematic Liquid Crystals as Cladding Layers", Applied Physics, vol. 83, No. 23, 2003.

Okamura, et al., "Low Voltage Driving in Nematic Liquid Crystal Overlayered Waveguide" Journal of Lightwave Technology, vol. LT-4, No. 3, Mar. 1986.

Sirleto, et al., "Optical Multimode Interference Router Based on a Liquid Crystal Waveguide", Journal of Optics A: Pure Appl. Opt. 5, 2003.

Sirleto, et al., Electro-Optical Switch and Continuously Tunable Filter Based on a Bragg Grating in a Planar Waveguide with a Liquid Crystal Overlayer, Opt. Eng. 41(11), Nov. 2002.

Valera, et al., "Bistability and Switching in Thin-Film Waveguides with Liquid-Crystal Cladding", Applied Physics Letter 48(9), Mar. 3, 1986.

Hu, et al., "Optical Deflection in Thin-Film Nematic Liquid-Crystal Waveguides", IEEE Journal of Quantum Electronics, vol. QE-10, No. 2, Feb. 1974.

Whinnery, et al., "Liquid-Crystal Waveguides for Integrated Optics", IEEE Journal of Quantum Electronics, vol. QE-13, No. 4, Apr. 1977.

Hu, et al., "Losses of a Nematic Liquid-Crystal Optical Waveguide", Journal of the Optical Society of America, vol. 64, No. 11, Nov. 1974.

(56) References Cited

OTHER PUBLICATIONS

Repasky, et al., "Tunable External-Cavity Diode Laser Based on Integrated Waveguide Structures", Opt. Eng. 42(8), Aug. 2003.

Oh Kee Kwan, et al., "Proposal of Electrically Tunable External-Cavity Laser Diode", IEEE Photonics Technology Letters, vol. 16, No. 8, Aug. 2004.

Sheridan, et al., "Elector-Optically Induced Deflection in Liquid-Crystal Waveguides", Journal of Applied Physics, vol. 45, No. 12, Dec. 1974.

Sneh, et al., "High-Speed Continuously Tunable Liquid Crystal Filter for Wdm Networks", Journal of Lightwave Technology, vol. 14, No. 6, Jun. 1996.

Gialorenzi, et al., "Light Scattering from Nematic Liquid-Crystal Waveguide", Journal of Applied Physics, vol. 46, No. 3, Mar. 1975.

Schnur, et al., "Prospectus for the Development of Liquid-Crystal Waveguides", Naval Research Laboratory, NRL Report 7507, Nov. 10, 1972.

European Search Report from corresponding European patent application (05722475.0) dated Nov. 22, 2007.

Liu, Zao, "Polarization Cross Coupling in Asymmetric Photonic Waveguides", Electrical and Computer Engineering Master's Theses, Northeastern University, Dept. of Electrical and Computer Engineering, Jan. 1, 2010.

Li, et al., "Radiation Hardness of High Resistivity Magnetic Czochralski Silicon Detectors After Gamma, Neutron, and Proton Radiations," Aug. 2004, IEEE Transactions on Nuclear Science, vol. 51, No. 4, pp. 1901-1908.

\* cited by examiner

LIQUID CRYSTAL WAVEGUIDE FOR DYNAMICALLY CONTROLLING POLARIZED LIGHT

CROSS-REFERENCE TO RELATED APPLICATION

This application is a continuation-in-part of U.S. patent application Ser. No. 10/963,946 entitled "LIQUID CRYSTAL WAVEGUIDE HAVING REFRACTIVE SHAPES FOR DYNAMICALLY CONTROLLING LIGHT" filed Oct. 12, 2004 now abandoned, which claimed the benefit under 35 U.S.C. 119(e) to U.S. Provisional patent application No. 60/539,030 entitled "LIQUID CRYSTAL WAVEGUIDE HAVING REFRACTIVE SHAPES FOR DYNAMICALLY CONTROLLING LIGHT AND TUNABLE LASER INCLUDING SAME" filed Jan. 22, 2004, the disclosures of which are hereby incorporated by reference in its entirety.

FIELD OF THE INVENTION

This invention relates, in general, to waveguides, and more particularly, to waveguides having liquid crystal materials therein.

BACKGROUND OF THE INVENTION

Light can be controlled using standard lenses and mirrors. These passive methods can be made active via mechanical motion. For example, mirrors can be placed on motorized stages or piezo mounts to move a mirror to control either the direction of light propagation and/or the total optical path length of a system. By altering the physical path length, the optical phase delay (OPD) of the light may be controlled. This technique is used in Fourier transform spectrometers, external cavity tunable diode lasers, tunable filters, etc.

However, mechanical control over light is undesirable for several reasons. First, it is difficult to make such mechanical devices compact. Second, the mechanical nature of such moving devices have limited lifetimes due to mechanical wear and failure issues. Third, mechanical devices are inherently vibration sensitive, which limits the type of environment in which they can be used. Finally, mechanical devices necessitate a level of design complexity including gears, bearings, and other mechanical components, which add cost, expense, and maintenance issues to such designs.

Rather than move a lens or a mirror with a motor or actuator, light can be controlled through the use of waveguides. For instance, U.S. Pat. No. 5,347,377 entitled "Planar Waveguide Liquid Crystal Variable Retarder" relates generally to providing an improved waveguide liquid crystal optical device, and discloses in Table I the use of alternating current voltages between 2 and 50 volts rms. This patent teaches, among other things, controlling the optical phase delay for TM polarized light.

Light can be characterized as having various polarized components, such as TM (transverse magnetic) and TE (transverse electric) polarizations, which relate to the magnetic and electric field components of light. Generally, if one chooses a reference plane that is oriented perpendicular to the light propagation direction, TM polarized light means that the magnetic field of a light wave is traversing or parallel to that plane, while the electric field of the light is substantially perpendicular to the plane. TE polarized light is characterized by the electric field of the light traversing or parallel to the same plane, while the magnetic field of the light is substantially perpendicular to that same plane.

In another non-mechanical technique for controlling light, thermo-optics can be used to control light. The temperature of a waveguide, constructed with thermo-optic material such as silicon oxynitride, can be used to alter the index of refraction (n) for light traveling through the waveguide. Such thermo-optic approaches typically provide for only limited changes in index of refraction ($dn/dt \approx 1.5 \times 10^{-5}/°$ C.), which in turn necessitates large temperature changes (up to 500° C. or higher) for significant light control. These devices can be power consumptive, which may be prohibitive for many applications.

An electro-optic approach may be generally less power consumptive than thermo-optics. With conventional waveguides, electro-optic materials, such as $LiNbO_3$, are employed whereby a voltage applied across such material changes the index of refraction, n. However, with these conventional techniques, the index of refraction can only be changed a very small amount, such as 0.0001 per kilo volt for bulk materials such as $LiNbO_3$. This limitation makes this type of light control extremely limited due to the high amount of voltage needed for significant light control.

While liquid crystal optics have become widespread in display applications, in such applications light is attenuated but the optical phase delay is not appreciably altered, or only to a very small degree, typically less than one wavelength of light (<1 micron). Use of conventional liquid crystal optical techniques to achieve active optical control would generally require prohibitively thick layers of liquid crystal (>100 microns), which would render the device highly opaque and slow. The thick layers of liquid crystal may be difficult or impossible to control. Furthermore, liquid crystal displays are typically polarization dependent.

Accordingly, as recognized by the present inventors, what is needed is a liquid crystal waveguide for controlling light that permits active control of the propagation of several different polarizations of light such as TM and TE polarized light through the waveguide in a manner that provides for low losses.

It is against this background that various embodiments of the present invention were developed.

SUMMARY

In light of the above and in accordance with one broad aspect of the present invention, disclosed herein is a method for controlling an optical phase delay (OPD) of TE polarized light traveling along a propagation direction through a waveguide. In one example, the method may include providing the waveguide with a core, at least one cladding, wherein the at least one cladding has liquid crystal molecules disposed therein, the liquid crystal molecules having longitudinal axes; initially aligning at least a portion of the liquid crystal molecules in an initial orientation with their longitudinal axes oriented at an out-of-plane tilt angle of 0 to 90 degrees, and their longitudinal axis oriented at an in-plane angle in the range of approximately 1 to 90 degrees measured relative to the propagation direction; providing the waveguide with a pair of electrodes for receiving a control signal; and applying the control signal to the pair of electrodes to rotate the liquid crystal molecules from the initial orientation, thereby controlling the optical phase delay of the TE polarized light traveling through the waveguide.

In one example, the method may also include TM polarized light also traveling through the waveguide along the propagation direction, and the operation of applying the control signal can control the optical phase delay of the TM polarized light, as well as controlling the optical phase delay of the TE polarized light. In one example, the optical phase delay for the TE polarized light is greater than the optical phase delay for the TM polarized light. In another example, the operation of applying the control signal can increase the optical phase delay of the TM polarized light and simultaneously decreases the optical phase delay of TE polarized light traveling through the waveguide. Alternatively, the operation of applying the control signal can decrease the optical phase delay of the TM polarized light and can simultaneously increase the optical phase delay of TE polarized light traveling through the waveguide.

According to another broad aspect of another embodiment of the present invention, disclosed herein is a method for controlling an optical phase delay of TE polarized light traveling along a propagation direction through a waveguide. In one example, the method may include providing the waveguide with a core, at least one cladding, wherein the at least one cladding has liquid crystal molecules disposed therein, the liquid crystal molecules having longitudinal axes; providing the waveguide with a pair of electrodes for receiving a control signal; and applying the control signal to the pair of electrodes to rotate the liquid crystal molecules from an initial orientation into a second orientation in order to alter the optical phase delay of the TE polarized light traveling through the waveguide, the second orientation characterized by at least a portion of the liquid crystal molecules aligned with their longitudinal axes oriented at an angle of 0 to 90 degrees relative to a plane of the waveguide, and with their longitudinal axis oriented at an angle in the range of approximately 1 to 90 degrees measured relative to the propagation direction.

According to another broad aspect of another embodiment of the present invention, disclosed herein is a method for controlling an optical phase delay of TE polarized light traveling along a propagation direction through a waveguide. In one example, the method may include providing the waveguide with a core, a cladding, wherein the cladding has liquid crystal molecules disposed therein, the liquid crystal molecules having longitudinal axes; initially aligning at least a portion of the liquid crystal molecules in an initial orientation with their longitudinal axes substantially perpendicular to the propagation direction of the TE polarized light and substantially within a plane of the waveguide; providing the waveguide with a pair of electrodes for receiving a control signal; and applying the control signal to the pair of electrodes to rotate the liquid crystal molecules from the initial orientation, thereby controlling the optical phase delay of the TE polarized light traveling through the waveguide. In one embodiment, the liquid crystal molecules may include nematic liquid crystal molecules or other types of liquid crystal molecules.

In one example, the operation of initially aligning at least a portion of the liquid crystal molecules in an initial orientation includes providing an alignment layer orientating the liquid crystal molecules in the initial orientation.

According to another broad aspect of another embodiment of the present invention, disclosed herein is a waveguide for controllably altering the optical path length of TE light traveling through the waveguide along a propagation direction. In one example, the waveguide may include a core for guiding the TE light through the waveguide; at least one cladding having liquid crystals molecules disposed therein, the liquid crystal molecules having longitudinal axes, the at least one cladding adjacent the core; an alignment layer adjacent to the at least one cladding, the alignment layer initially aligning at least a portion of the liquid crystal molecules in an initial orientation with their longitudinal axes oriented at an out-of-plane title angle of 0 to 90 degrees, and their longitudinal axis oriented at an in-plane angle in the range of approximately 1 to 90 degrees measured relative to the propagation direction; and a pair of electrodes for receiving a voltage for creating an electric field between the electrodes and through the at least on cladding, the electric field being oriented substantially perpendicular to the propagation direction of the TE light traveling through the waveguide. In this embodiment, as the voltage is applied to the pair of electrodes, alignment of the liquid crystals changes so the optical phase delay changes for the TE light traveling through the waveguide.

In one example, the core has an index of refraction greater than approximately 1.55. The core may include or be formed of tantalum pentoxide material, in one example. The at least one cladding may be implemented as an upper cladding and a lower cladding, the upper and lower claddings positioned about the core.

According to another broad aspect of another embodiment of the present invention, disclosed herein is a waveguide for controllably altering the optical path length of TE light traveling through the waveguide along a propagation direction. In one example, the waveguide may include a core for guiding the TE light through the waveguide; at least one cladding having liquid crystals molecules disposed therein, the liquid crystal molecules having longitudinal axes; an alignment layer adjacent to the at least one cladding, the alignment layer initially aligning at least a portion of the liquid crystal molecules in an initial orientation; and a pair of electrodes positioned about the core, the pair of electrodes for receiving a control signal for creating an electric field between the electrodes, the electric field being oriented substantially perpendicular to the propagation direction of the TE light traveling through the waveguide. In this example, as the control signal is applied to the pair of electrodes, alignment of the liquid crystals changes to a second orientation in order to alter the optical phase delay for the TE light traveling through the waveguide, the second orientation characterized by at least a portion of the liquid crystal molecules aligned with their longitudinal axes oriented at an angle of 0 to 90 degrees relative to a plane of the waveguide, and with their longitudinal axis oriented at an angle in the range of approximately 1 to 90 degrees measured relative to the propagation direction.

In another example, TM polarized light may also travel through the waveguide along the propagation direction, wherein as the control signal is applied to the pair of electrodes, the optical phase delay also changes for the TM polarized light traveling through the waveguide. In one embodiment, the optical phase delay for the TE polarized light is greater than the optical phase delay for the TM polarized light. In another embodiment, as the control signal is applied to the pair of electrodes, the optical phase delay increases for the TM polarized light traveling through the waveguide and simultaneously the optical phase delay of the TE polarized light traveling through the waveguide decreases. Alternatively, as the control signal is applied to the pair of electrodes, the optical phase delay may decrease for the TM polarized light traveling through the waveguide and simultaneously the optical phase delay of the TE polarized light traveling through the waveguide may increase.

According to another broad aspect of another embodiment of the present invention, disclosed herein is a waveguide for controllably altering the optical path length of TE light traveling through the waveguide along a propagation direction. In one example, the waveguide may include a core for guiding the TE light through the waveguide; at least one cladding having liquid crystals molecules disposed therein, the liquid crystal molecules having longitudinal axes; an alignment layer adjacent to the at least one cladding, the alignment layer initially aligning at least a portion of the liquid crystal molecules in an initial orientation with their longitudinal axes substantially perpendicular to the propagation direction of the TE polarized light and substantially within a plane of the waveguide; and a pair of electrodes positioned about the core, the pair of electrodes for receiving a voltage for creating an electric field between the electrodes, the electric field being oriented substantially perpendicular to the propagation direction of the TE light traveling through the waveguide. In this embodiment, as the voltage is applied to the pair of electrodes, alignment of the liquid crystals changes so the optical phase delay changes for the TE light traveling through the waveguide.

According to another broad aspect of one embodiment of the invention, disclosed herein is a method for controlling an optical phase delay of TE polarized light traveling along a propagation direction through a waveguide. In one example, the method may include providing the waveguide with a core, an upper cladding and a lower cladding, wherein the upper cladding has liquid crystal material disposed therein, the liquid crystal material having a plurality of liquid crystal molecules each with a long axis and a short axis; providing the waveguide with a first pair of electrodes for receiving a control voltage; orienting the liquid crystals in a first orientation; and applying the control voltage across the first pair of electrodes to alter the orientation of the liquid crystals into a second orientation, thereby controlling the optical phase delay of the TE polarized light traveling through the waveguide. By altering the applied voltage, the amount of OPD for the TE polarized light may be dynamically controlled.

In one embodiment, the first orientation substantially positions the plurality of liquid crystals with their long axis substantially perpendicular to the propagation direction of the TE polarized light and substantially within a plane of the waveguide, and the second orientation substantially positions the plurality of liquid crystals with their long axis substantially perpendicular to the propagation direction of the TE polarized light and substantially perpendicular to the plane of the waveguide.

In another embodiment, the first orientation substantially positions the plurality of liquid crystals with their long axis substantially parallel to the propagation direction of the TE polarized light, and the second orientation substantially positions the plurality of liquid crystals with their long axis substantially perpendicular to the propagation direction of the TE polarized light and substantially within a plane of the waveguide.

The waveguide may also be provided with multiple sets or pair of electrodes for providing different regions of TE or TM light control. In one example, the method may include providing the waveguide with a second pair of electrodes for receiving a second control voltage; orienting the liquid crystals adjacent to the second pair of electrodes in a third orientation; and applying the second control voltage across the second pair of electrodes to alter the orientation of the liquid crystals into a fourth orientation. In this example, the first orientation substantially positions the plurality of liquid crystals with their long axis substantially perpendicular to the propagation direction of the TE polarized light and substantially within a plane of the waveguide, and the second orientation substantially positions the plurality of liquid crystals with their long axis substantially perpendicular to the propagation direction of the TE polarized light and substantially perpendicular to the plane of the waveguide. If desired, the third orientation substantially positions the plurality of liquid crystals with their long axis substantially parallel to the propagation direction of the TE polarized light and substantially within a plane of the waveguide; and the fourth orientation substantially positions the plurality of liquid crystals with their long axis substantially perpendicular to the propagation direction of the TE polarized light and substantially perpendicular to the plane of the waveguide.

According to another broad aspect of another embodiment of the present invention, disclosed herein is a waveguide for controllably altering the optical path length of TE light traveling through the waveguide along a propagation direction.

In one example, a liquid crystal waveguide dynamically controls the speed, or the effective index of refraction, of light passing through the waveguide. In one example, the speed of light for one or more input polarizations can be dynamically controlled in a manner that is either independent or synchronous.

In one example, the waveguide may include a core for guiding the TE light through the waveguide; at least one cladding having liquid crystals disposed therein; and a pair of electrodes positioned about the core, the pair of electrodes for receiving a voltage for creating an electric field between the electrodes, the electric field being oriented substantially perpendicular to the propagation direction of the TE light traveling through the waveguide. In one example, as the voltage is applied to the pair of electrodes, alignment of the liquid crystals changes so the optical phase delay changes for the TE light traveling through the waveguide.

In one embodiment, the alignment of the liquid crystals changes from a first orientation where the liquid crystals are substantially perpendicular to the propagation direction of the TE polarized light and substantially within a plane of the waveguide, to a second orientation where the liquid crystals are substantially perpendicular to the propagation direction of the TE polarized light and substantially perpendicular to the plane of the waveguide.

In another embodiment, the alignment of the liquid crystals changes from a first orientation where the liquid crystals are substantially parallel to the propagation direction of the TE polarized light, to a second orientation where the liquid crystals are substantially perpendicular to the propagation direction of the TE polarized light and substantially within a plane of the waveguide.

Other features, utilities and advantages of the various embodiments of the invention will be apparent from the following more particular description of embodiments of the invention as illustrated in the accompanying drawings.

DETAILED DESCRIPTION

Figure 1:
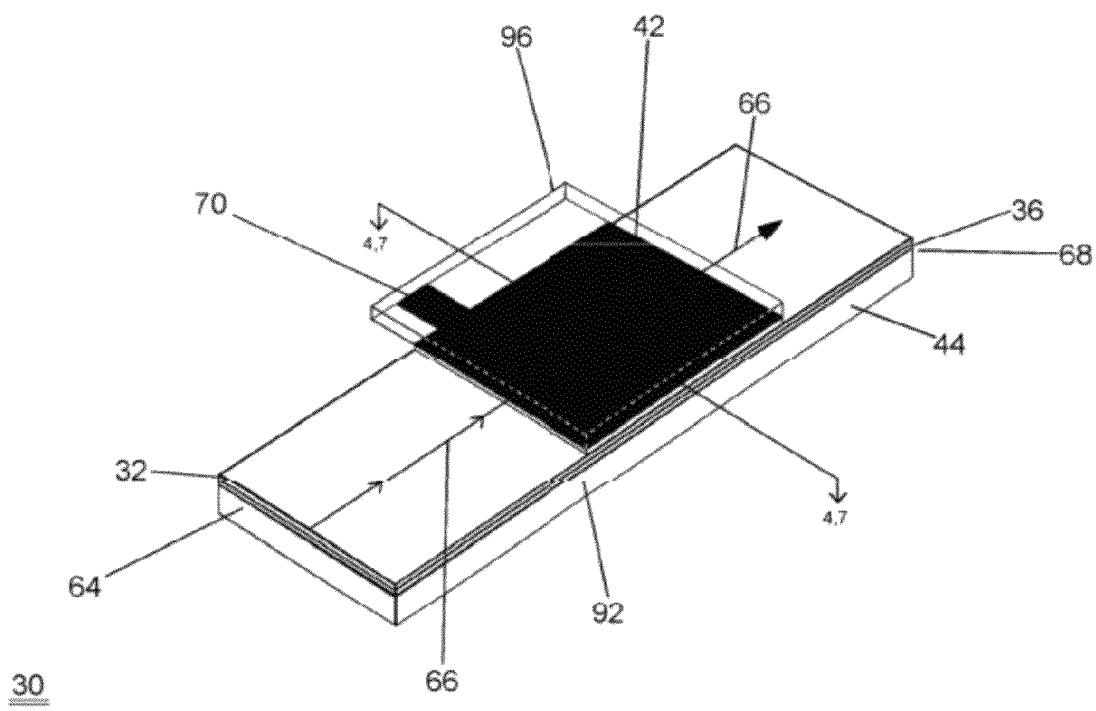
FIG. 1 illustrates an example of a waveguide for providing active control of light propagation, in accordance with an embodiment of the present invention.

Disclosed herein are various embodiments of a waveguide for dynamically controlling—through electronic, non-mechanical controls—the optical phase delay (OPD) (as well as other characteristics) of light of TE and TM polarizations passing through a waveguide.

Generally and in accordance with one embodiment of the present invention, a waveguide (such as waveguide 30 shown in FIGS. 1, 4A-B) may be formed having a core or core layer 32, an upper and lower cladding 34, 36 proximate or adjacent to the core 32, and liquid crystal materials 38 disposed within the upper or lower cladding 34, 36. One or more alignment layers (i.e., 40 and 41) can be provided which provide or bias an initial orientation of the collection of liquid crystals 38 in the cladding (such as within the upper cladding 34). A pair of electrodes (i.e., 42 and 44), which may be implemented as electrode planes, may be provided in the waveguide for receiving a voltage 46 applied therebetween which will induce a re-orientation of the liquid crystals 38 and therefore control the index of refraction of the waveguide or controllably alter the OPD experienced by the light 66.

For purposes of describing various embodiments of the inventions, the liquid crystal molecules 38 may be characterized as having a longitudinal axis which may be oriented at an out-of-plane tilt angle with respect to the plane of the waveguide, and an in-plane angle with respect to the direction of light propagation. This is discussed in greater detail below with respect to FIGS. 17-18.

Figure 5A:
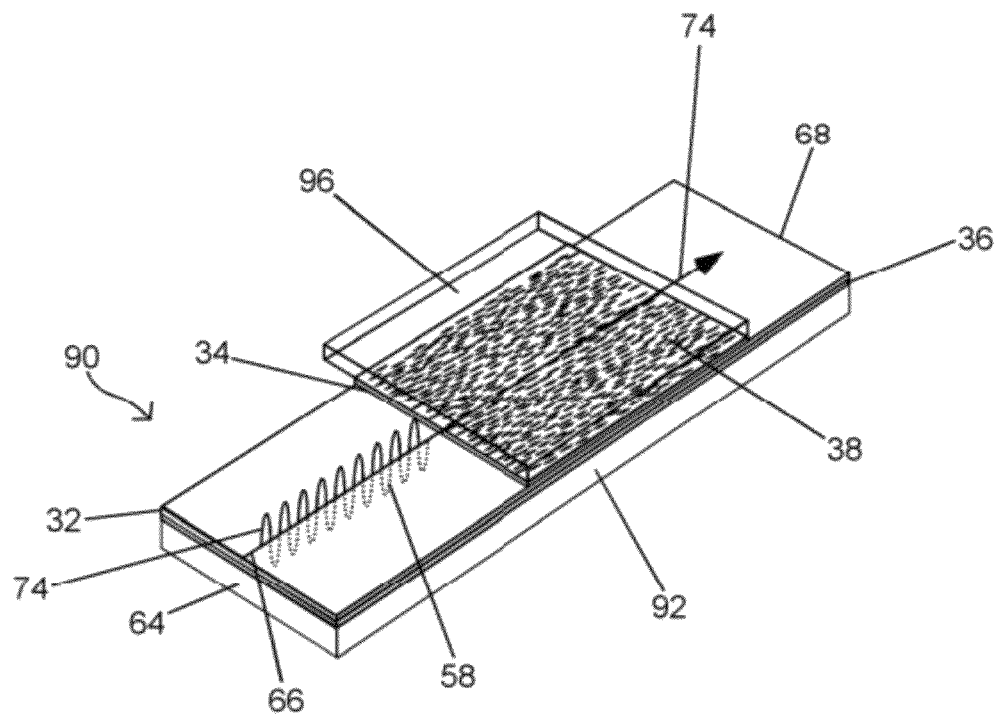
FIGS. 5A-B illustrate an example of a waveguide, with liquid crystals aligned for providing active control of TM polarized light propagation (TM light is shown) as voltage is applied to an electrode in the waveguide, in accordance with an embodiment of the present invention.

In accordance with embodiments of the present invention, the orientation of liquid crystals 38 and/or the geometry of electrodes (i.e., 42, 44) may be provided so as to permit independent and/or simultaneous control over TE and TM polarized light. As disclosed herein, a waveguide may be formed using a liquid crystal (LC) alignment that provides for dynamic, simultaneous control over TE and TM polarized light (see FIGS. 2, 3, 4); or a waveguide may be formed using an LC alignment that provides for dynamic control over only TM polarized light, with no or only negligible effects on TE polarized light (see FIGS. 5, 6, 7).

Figure 11A:
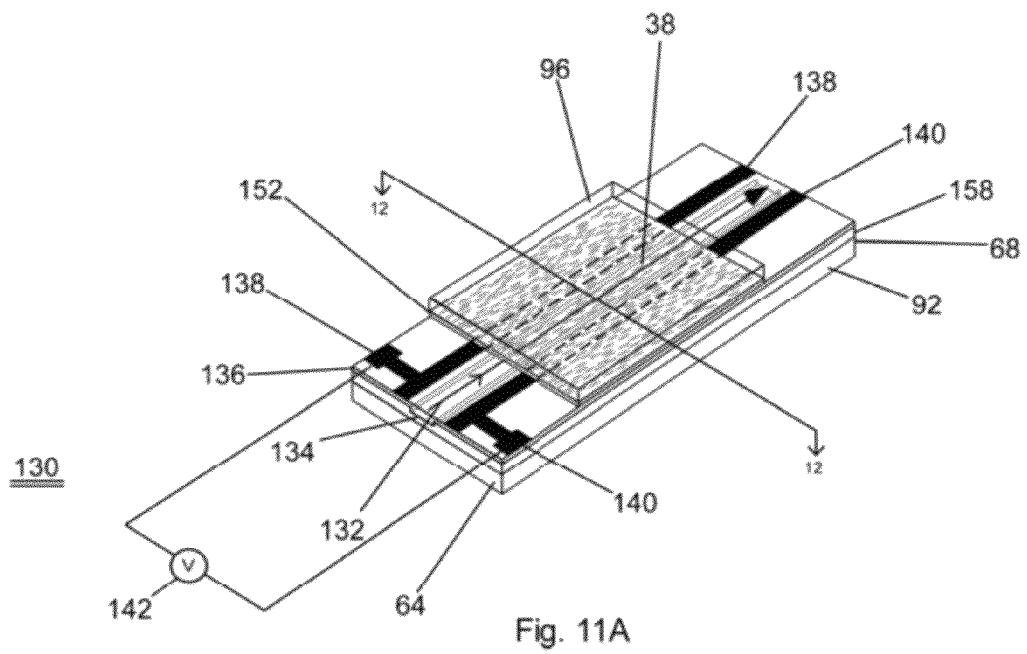
FIG. 11A-B illustrates an example of a waveguide having a channel therein with a pair of electrodes along the outer edges of the channel for providing active control of light propagation, in accordance with an embodiment of the present invention.
Figure 11B:
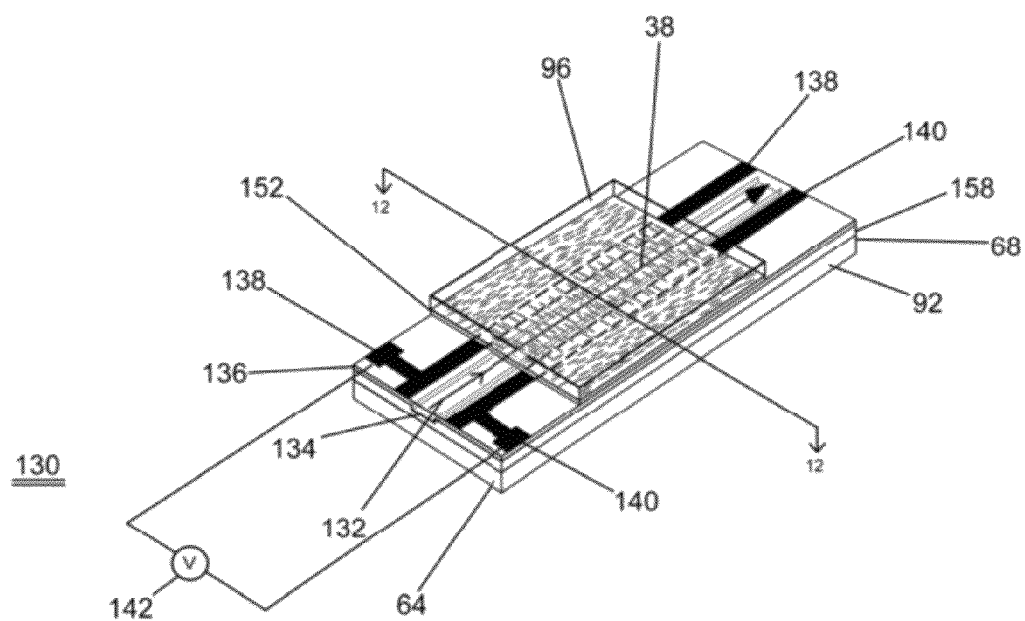

Furthermore, a waveguide structure may be combined with an LC alignment that provides dynamic control over only TE polarized light, with no or only negligible effects on TM polarized light (see FIGS. 11, 12); or alternatively, a waveguide may include two or more regions such that simultaneous and/or independent control over both TE and TM polarized light is provided (see FIGS. 13-14, 15-16).

In other embodiments, a waveguide may be constructed such that the polarization state remains unchanged upon passing from the waveguide input to the waveguide output. Alternatively, a waveguide may be constructed such that TE polarized light is converted in a controlled manner to TM polarized light, and/or TM polarized light is converted in a controlled manner to TE polarized light.

Figure 13:
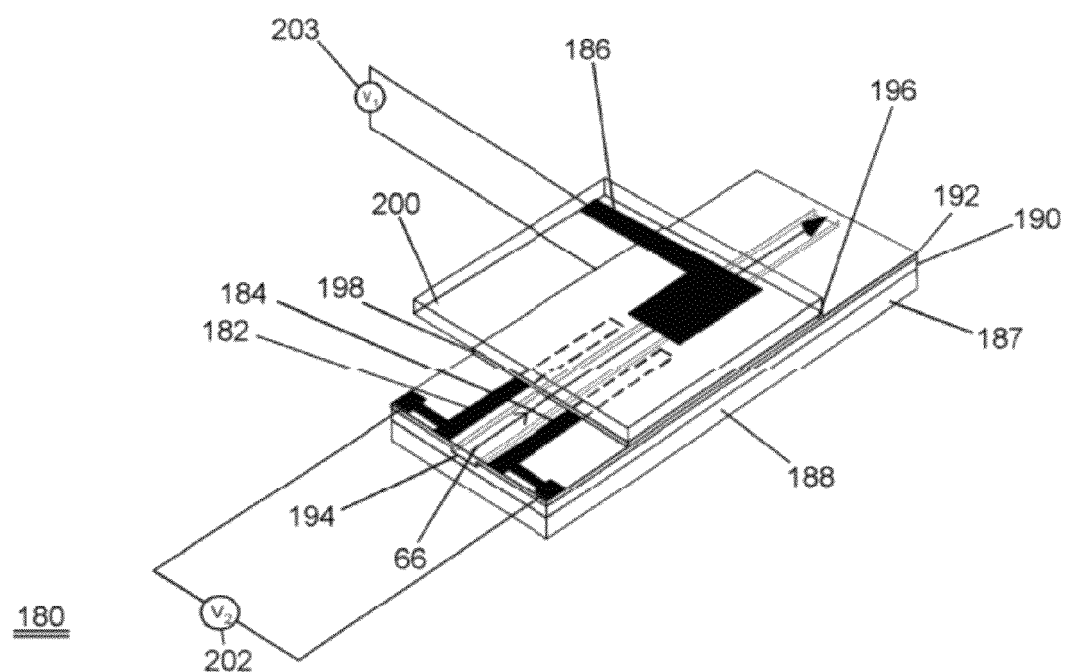
FIG. 13 illustrates an example of a waveguide having two sets or regions of electrodes for simultaneous and/or independent control of light propagation over both TE and TM polarizations of light, in accordance with an embodiment of the present invention.
Figure 16:
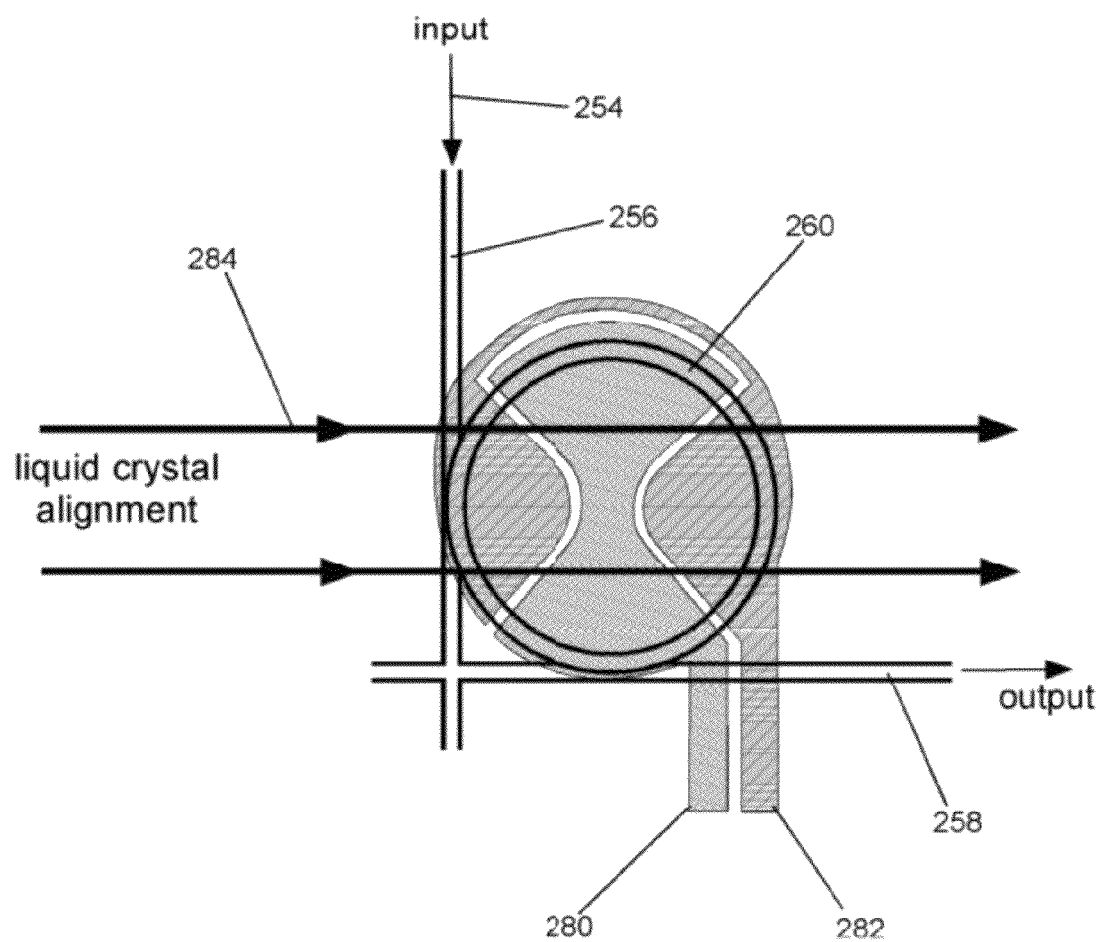
FIG. 16 illustrates a top view of another embodiment of a voltage tunable ring resonator wherein two electrodes are provided for simultaneous and/or independent control of light propagation over both TE and TM polarizations of light, in accordance with one embodiment of the present invention.

Further, a waveguide or devices including a waveguide can be rendered polarization independent if desired (see FIGS. 13, 14, 16). Various embodiments of the present invention are described herein.

Hence, embodiments of the present invention can be used to simultaneously and/or independently control the index of refraction, OPD or other optical characteristics for particular types of polarized light, such as TM polarized light and TE polarized light. TE polarized light and TM polarized light may be formed by manipulating light in any number of conventional manners, such as through polarizers or waveplates. Embodiments of the invention may be used with polarized or un-polarized light, depending upon the implementation.

Figure 2A:
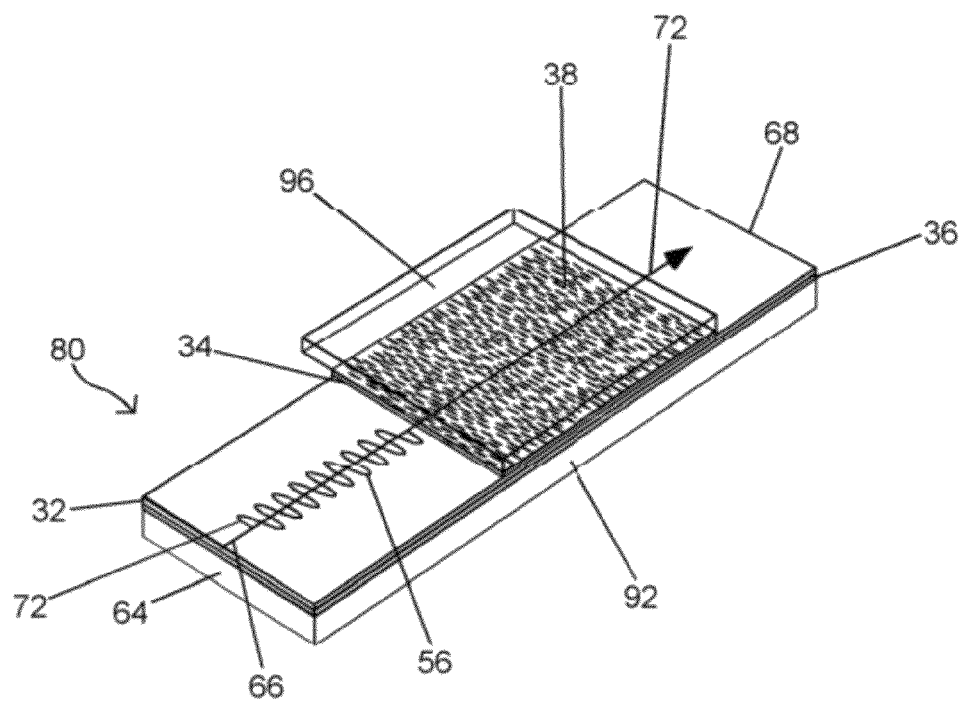
FIGS. 2A-B illustrate an example of a waveguide, with liquid crystals aligned for providing active control of TE and TM polarized light propagation (TE light is shown) as voltage is applied to an electrode in the waveguide, in accordance with an embodiment of the present invention.
Figure 2B:
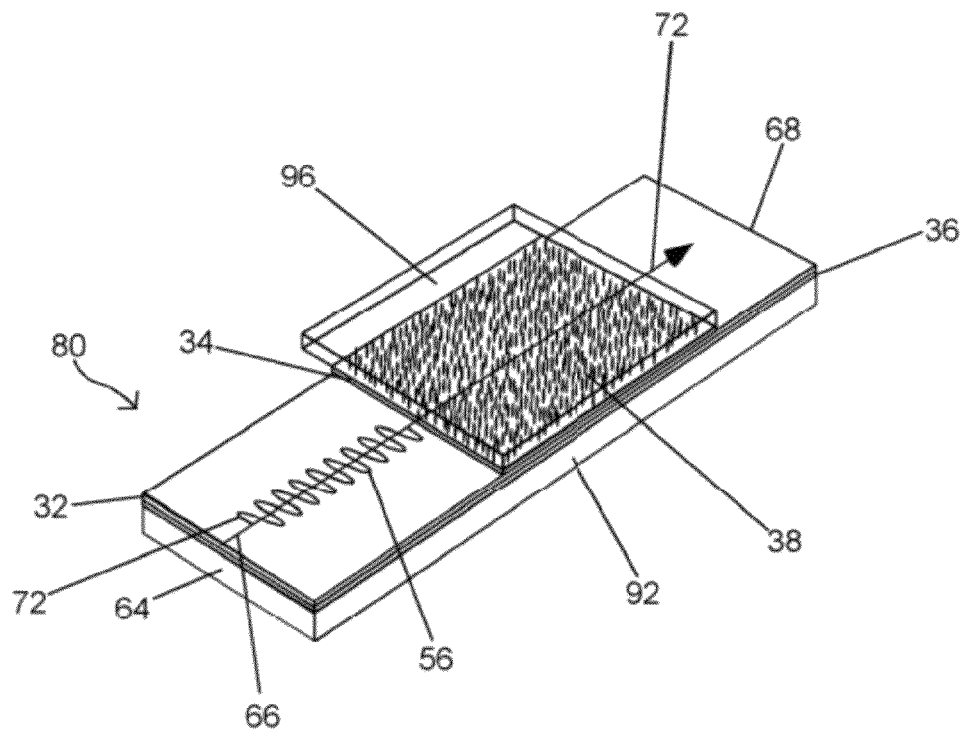

Generally, TE (Transverse Electric) polarized light can be characterized by the electric field of the light traversing within the plane of the waveguide, while the magnetic field of the light is substantially perpendicular to the plane of the waveguide (see, for example, FIGS. 2A-2B showing a representation of the electric field 56 for TE polarized light 72).

Figure 3A:
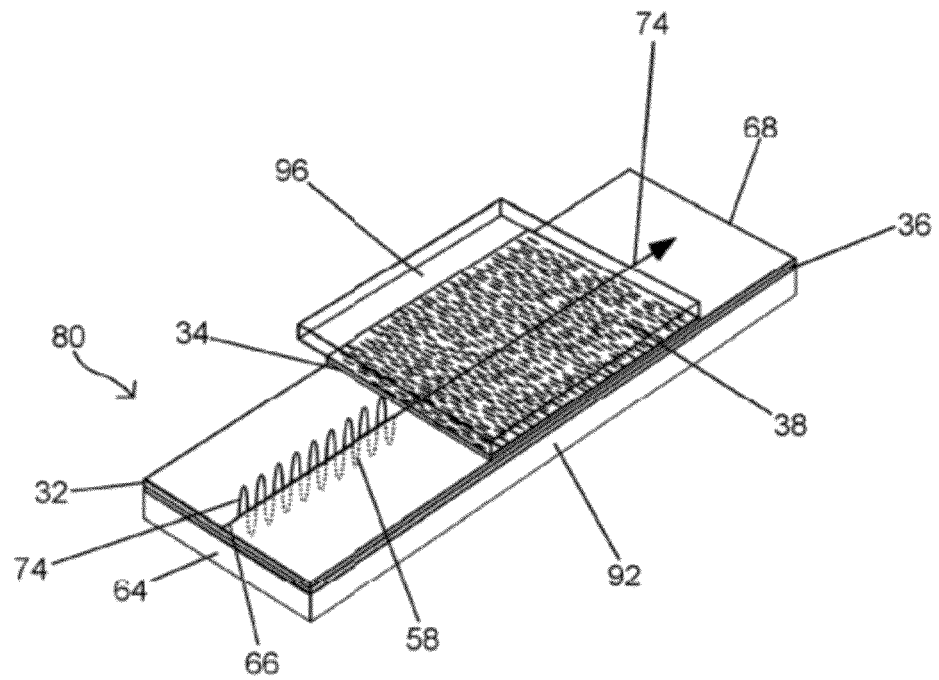
FIG. 3A-B illustrate the waveguide of FIGS. 2A-B wherein the waveguide has liquid crystals aligned for providing active control of TE and TM polarized light propagation (TM light is shown) as voltage is applied to an electrode in the waveguide, in accordance with an embodiment of the present invention.
Figure 3B:
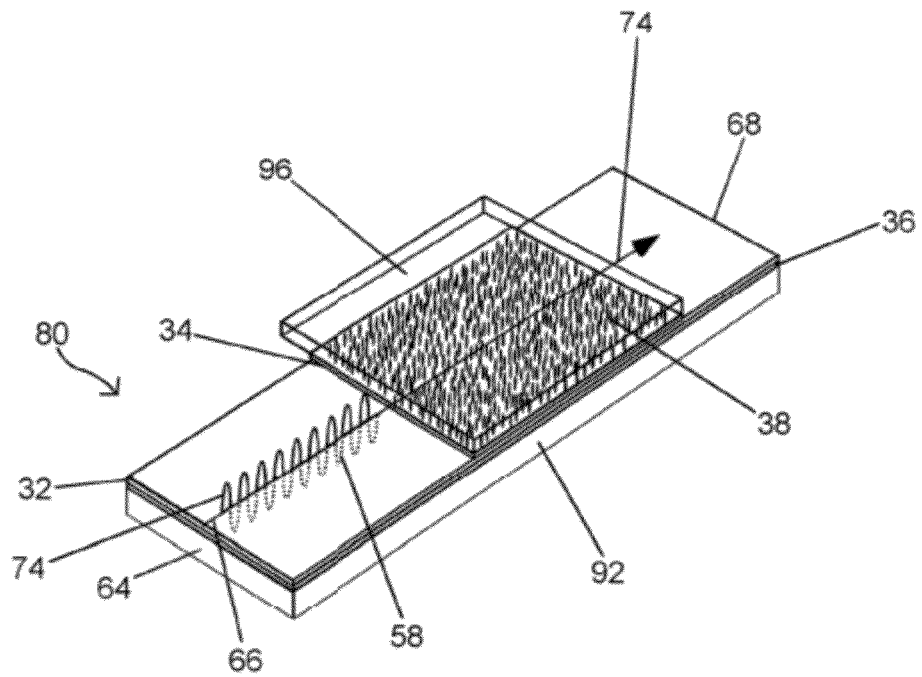

Generally, TM (Transverse Magnetic) polarized light can be characterized by the magnetic field of the light wave traversing within the plane of the waveguide, while the electric field of the light is substantially perpendicular to the plane of the waveguide (see, for example, FIGS. 3A-3B showing a representation of the electric field 58 of TM polarized light 74).

For purposes of describing operations of embodiments of the present invention, the electric fields 56, 58 of TE and TM light will be shown and described to the extent that they are affected by a particular waveguide. In this application (such as in FIGS. 2, 3, 5, 6 and in this description), the electric fields 56, 58 of TE and TM light are depicted and described as waves in order to simplify the description.

The control of light and the attendant results that may be achieved by embodiments of the present invention can be characterized in numerous ways. The speed at which light propagates through a waveguide may be dictated by and characterized in many ways—by an effective index of refraction, a waveguide index, or an index of refraction. The degree to which the index of refraction is altered, for example by an applied voltage in an embodiment of the present invention, may be referred to as the modulation index.

For a given index of refraction and a given path length through a waveguide, the light exiting the waveguide will have a certain optical phase. As the index of refraction is controllably altered as described herein, the optical phase of the light exiting the liquid crystal waveguide will also be controllably altered. The change in optical phase is referred to as the optical phase delay (OPD). Additionally, optical phase delay (OPD) may also refer to the change in optical phase between two polarizations of light which are simultaneously traveling through a waveguide. For instance, as a voltage is applied across a waveguide with liquid crystal therein as disclosed herein, the concurrent change in optical phase between the two polarizations may also be referred to as an optical phase delay. For instance, this may be a voltage-controlled change in the optical phase of TE polarized light with respect to the optical phase of TM polarized light. Or a change in optical phase may occur with respect to a single type of polarized light in that the input phase and output phase of the light may change based on characteristics of the waveguide. For example, the optical phase delay may be the difference between the optical phase of light that has traveled through a length of space, wherein the index of refraction for free space is equal to one, and the optical phase of light that has traveled through the same length of the waveguide, wherein the index of refraction of the waveguide may be dynamically controlled by a voltage.

The wavelength of light passing through a waveguide is dependent upon the index of refraction for the waveguide. Therefore, as the index of refraction changes in a waveguide in accordance with an example of the invention, there will also be a change in the wavelength of light.

The total number of optical waves within a length of a waveguide of the present invention may define the optical path length (OPL) of a waveguide. As the index of refraction of the waveguide is controllably altered, the optical path length (OPL) of the waveguide may therefore also be controllably altered.

Hence, embodiments of the present invention may be used to controllably and dynamically alter the effective index of refraction, waveguide index, modulation index, and/or optical path length of a waveguide; and embodiments of the present invention may be used to controllably and dynamically alter the wavelength or optical phase delay of light passing through a waveguide. These terms are used throughout this disclosure.

Figure 4A:
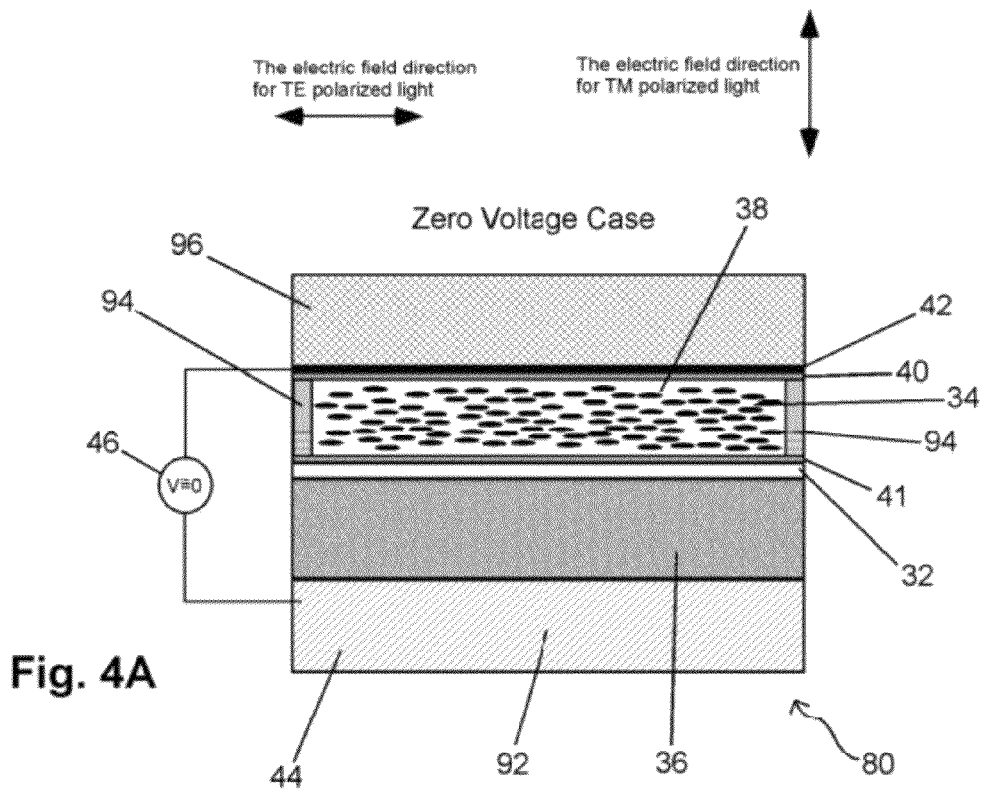
FIG. 4A illustrates a sectional view taken along section lines 4-4 of FIG. 1 for providing active control of TE and TM polarized light propagation, where no voltage is applied across the electrode, in accordance with an embodiment of the present invention.
Figure 4B:
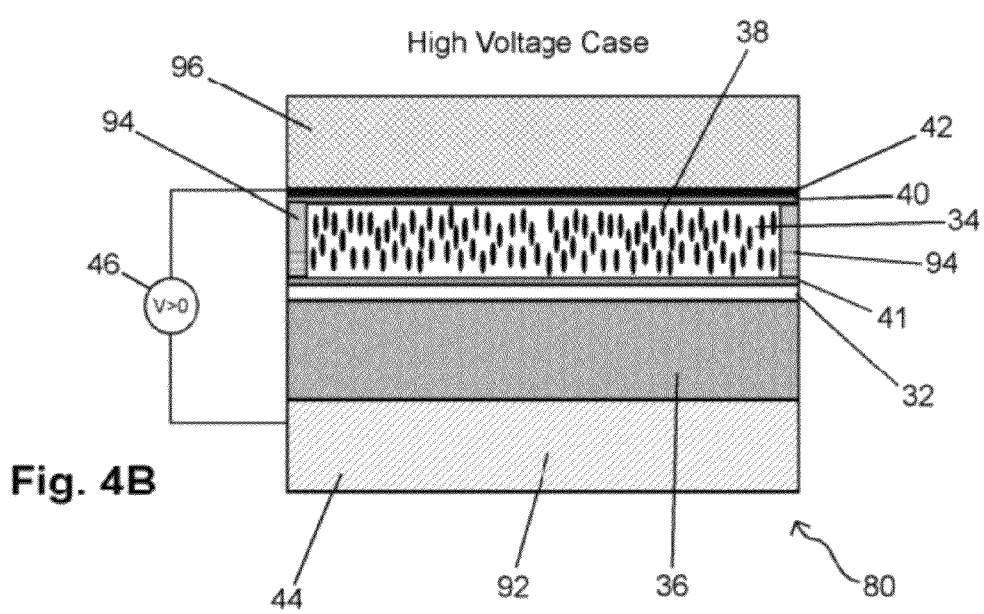
FIG. 4B illustrates a sectional view taken along section lines 4-4 of FIG. 1 for providing active control of TE and TM polarized light propagation, where a voltage is applied across the electrode, in accordance with an embodiment of the present invention.

As shown in FIGS. 1 and 4A-B, in one example, a waveguide 30 may include a core 32, a pair of claddings 34, 36 surrounding the core 32 wherein one of the claddings (e.g., the upper cladding 34) contains liquid crystal material 38 therein. In one example, one or more electrodes 42, 44 or an electrode layer are positioned above the upper cladding 34 (having liquid crystal material 38 therein), and a lower electrode or electrode layer or plane 44 is positioned below the lower cladding 36 and may act as a ground plane. Hence, a voltage 46 can be applied across the upper and lower electrodes 42, 44 to create an electric field therebetween, as shown for example in FIG. 4B. As shown in FIG. 4A, an upper alignment layer 40 can be positioned about the upper surface of the upper cladding 34 for providing an initial orientation of the liquid crystal material 38 within the cladding 34; a lower alignment layer 41 can be positioned about the lower surface of the upper cladding 34, also for providing an initial orientation of the liquid crystal material 38 within the cladding. The initial orientation may provide the longitudinal axes of the liquid crystal molecules with an initial out-of-plane tilt angle and an initial in-plane angle, as described below in FIGS. 17-18. Depending upon the implementation, a waveguide may be provided with either an upper 40 or lower 41 alignment layer, or both, or neither.

The liquid crystal material 38, in one example, includes a nematic liquid crystal with a positive dielectric anisotropy. Nematic liquid crystal molecules typically have a long axis and a short axis, and one may consider the long axis to be a longitudinal axis.

In one example, the alignment layers 40, 41 may be utilized to orient at least a portion of the molecules such that the longitudinal axes of each liquid crystal molecule are substantially parallel to one another and the group of molecules point in a generally uniform direction over a region or area.

The liquid crystal material 38 beneath the electrode(s) 42 can be characterized as having a tunable and dynamic index of refraction. As voltage 46 is applied and increased between the upper electrode(s) 42 and the lower electrode plane 44, the index of refraction of the liquid crystal material 38 under the upper electrode(s) 42 is controllably changed as a function of the voltage 46 applied, which in turn alters the indices of refraction for TE and TM polarized light. Hence, the amount of optical phase delay between TE and TM light passing through a waveguide 30 of the present invention can be controllably altered. The propagation speed of light as it passes through a waveguide 30 can be controlled electronically and without any moving parts to perform numerous useful functions, such as for use in interferometers, optical filters, tunable lasers, or other applications.

As shown in the example of FIG. 1, a waveguide 30 may be generally rectangular in shape and may include a core 32 having a generally rectangular cross-section or defining a parallel piped. On the front end 64 of the waveguide 30, light 66 is introduced into the waveguide core 32 (for instance, through any conventional coupling mechanism such as a cylindrical lens) and propagates along the length of the waveguide 30 to the distal end 68 of the waveguide 30. As shown in FIG. 1, the direction of propagation of light 66 through the waveguide 30 is generally along the length of the waveguide 30, and use of embodiments of the present invention permit the propagation speed for one or more polarizations to be controllably altered depending, in part, on the alignment of the liquid crystals 38 and the voltages 46 applied between the upper electrode(s) and the lower electrode or plane 42,44. Although the waveguide 30 in FIG. 1 is shown as generally rectangular, it is understood that a waveguide made according to one or more embodiments of the present invention could have other shapes such as square, trapezoid, parallelogram, any polygon, or even be diced or scribed so as to have rounded edges producing elliptical, circular, or any curved shape.

Various embodiments of a waveguide are disclosed in the co-pending, commonly assigned U.S. patent application Ser. No. 10/963,946 entitled "LIQUID CRYSTAL WAVEGUIDE HAVING REFRACTIVE SHAPES FOR DYNAMICALLY CONTROLLING LIGHT" filed Oct. 12, 2004, the disclosure of which is hereby incorporated by reference in its entirety, and one or more of the waveguides disclosed therein may be used with one or more of the features of the present invention.

In one example, the electrode(s) 42,44 may include a tab or extension 70 there from which permits the electrode(s) 42 to be electrically connected to other electrical elements, such as a voltage source 46 coupled between the electrode(s) 42 and the lower electrode or plane 44. Alternatively, electrical traces, conductors, vias or other conventional connection types may be utilized to electrically couple an electrode to other electrical elements. Depending upon the implementation, the applied voltage 46 can be a DC voltage, or an AC voltage, for instance at low frequencies ranging to high frequencies such as 50 KHz or higher.

As recognized by the present inventors, the degree to which the effective index of refraction of the waveguide 30 is altered with application of voltage 46 is dependent, in part, on the polarization of the input light 66 and the liquid crystal 38 alignment.

Polarized light that is traveling through aligned liquid crystal material 38 will experience a higher index of refraction if the electric field 56,58 (FIGS. 2A-B, 3A-B) of the light 66 is parallel to the longitudinal axis of the aligned liquid crystal molecules 38. Alternately, polarized light that is traveling through the aligned liquid crystal material 38 with an electric field that is perpendicular to the longitudinal axis of the aligned liquid crystal molecules 38 will experience a lower index of refraction.

In accordance with one embodiment of the present invention, the orientation of the liquid crystal molecules 38 can be dynamically controlled through application of a voltage 46 across the liquid crystal material 38 in the cladding 34. In other words, the out-of-plane tilt and in-plane angle of the longitudinal axes of the liquid crystal molecules may be dynamically controlled through application of a voltage 46. In general, the liquid crystal molecules 38 with a positive dielectric anisotropy will align towards an electric field that is created via the applied voltage 46. In one embodiment, by controllably re-aligning the orientation of the liquid crystal material 38 in a waveguide, the index of refraction for varying polarizations can be controllably altered.

A waveguide can be formed so as to provide control of both TM polarized light (see 74 of FIGS. 3A-B) and TE polarized light (see 72 of FIGS. 2A-B), in accordance with one embodiment of the present invention. In one example as shown in FIGS. 2A-B, FIGS. 3A-B, and FIGS. 4A-B the liquid crystal molecules 38 are aligned (for example, through the use of alignment layers 40,41) such that when no voltage 46 is applied (FIGS. 2A and 3A), the longitudinal axes of the liquid crystal molecules 38 are substantially parallel to or in the plane of the waveguide 80 and are substantially perpendicular to the direction of light 66 propagation. In other words, the angle between the longitudinal axes of the liquid crystal molecules 38 and the plane of the waveguide 80, i.e., the out-of-plane tilt angle, is approximately zero or small, and the angle between the longitudinal axes of the liquid crystal molecules 38 and the direction of light propagation 66 is approximately ninety degrees or generally large.

In this example, as voltage 46 across the electrodes 42,44 is increased (FIGS. 2B and 3B), the liquid crystal molecules 38 will rotate upright, or stated differently, will rotate in a plane defined by the normal to the waveguide 80, thereby increasing the out-of-plane tilt angle. This effect is further depicted in FIGS. 4A-4B which show a sectional view of the waveguide 80 of FIGS. 2-3. In FIG. 4A, when no voltage 46 is applied, the liquid crystals 38 are biased or initially positioned such that their longitudinal axes are generally parallel to the waveguide 80 plane (approximately zero degrees of out-of-plane tilt) and are perpendicular to the propagation of light 66 (approximately ninety degrees of in-plane angle); and in FIG. 4B, when a voltage 46 is applied, the liquid crystals 38 are oriented such that their longitudinal axes generally are perpendicular to the waveguide 80 plane, i.e., the out-of-plane tilt angle is approximately ninety degrees.

By rotating the liquid crystals 38 upwardly as shown in FIGS. 2B and 3B by the application of voltage 46 to the electrodes 42,44, TE polarized light 72 traveling through the waveguide 80 will experience a reduced effective index of refraction/greater OPD/greater OPL, while TM polarized light 74 traveling through the waveguide will experience a greater, effective index of refraction/greater OPD/greater OPL.

As shown in FIGS. 2A-B and FIGS. 4A-B, TE polarized light 72 will experience a decrease in the effective index of refraction/OPD/OPL. In FIGS. 2A-B, the electric field vector 56 for TE polarized light 72 is substantially in and parallel to the plane of the waveguide 80. When no voltage 46 is applied to the electrodes 42,44, the longitudinal axes of the liquid crystal molecules 38 will have a significant projection along the electric field of the TE polarized light 72. Stated differently, when the longitudinal axes of the affected liquid crystals 38 are substantially perpendicular to the direction of propagation of light 66 traveling through the waveguide 80 (the in-plane angle is approximately ninety degrees) and in the plane of the waveguide 80 (the out-of-plane tilt is approximately zero degrees or small), or the longitudinal axes of the affected liquid crystals 38 are at intermediate stages such that they are not, perpendicular to the waveguide 80, then TE polarized light 72 experiences a higher index of refraction within the volume of liquid crystals 38 beneath the electrode 42. This is because the E field 56 of the TE propagating light 72 interacts more strongly with the LC molecules 38 when the long axes of the molecules 38 are parallel to the E field 56.

As the liquid crystal molecules 38 rotate upright in FIG. 2B, thereby increasing the out-of-plane tilt angle, the electric field 56 of the TE polarized light 72 will become largely perpendicular to the longitudinal axes of the molecules 38, and accordingly TE polarized light 72 will experience a reduction in the effective index of refraction/OPD/OPL.

As shown in FIGS. 3A-B, TM polarized light 74 will experience an increase in the effective index of refraction/OPD/OPL as voltage 46 is applied to the electrodes 42,44. In FIG. 3A-3B, a representation of the electric field 58 vector for TM polarized light 74 is shown. This TM electric field 58 is substantially normal to the plane of the waveguide 80. When no voltage 46 is applied (FIG. 3A), the electric field 58 of the TM polarized light 74 is substantially perpendicular to the long axes of the liquid crystal molecules 38, and accordingly TM polarized light 74 experiences relatively low effective index of refraction/OPD/OPL in this state.

As voltage 46 across the electrodes 42,4.4 is increased (FIG. 3B) and the liquid crystal molecules 38 rotate upright in a plane defined by the normal to the waveguide 80, this will increase the effective index of TM polarized light 74 because the longitudinal axes of the liquid crystal molecules 38 will have an increasing projection along the electric field 58 of the TM polarized light 74.

In this manner, the optical phase delay/optical path length/effective index of refraction of TM polarized light 74 may be dynamically increased by increasing the applied voltage 46, and the optical phase delay/optical path length/effective index of refraction of TM polarized light 74 may be dynamically decreased by decreasing the applied voltage 46 or disabling application of the voltage 46 across the electrodes 42,44. At the same time, the optical phase delay/optical path length/effective index of refraction of TE polarized light 72 may be dynamically decreased by increasing the applied voltage 46, and the optical phase delay/optical path length/effective index of refraction of TE polarized light 72 may be dynamically increased by decreasing the applied voltage 46 or disabling application of the voltage 46 across the electrodes 42,44.

A waveguide 90 can be formed so as to provide control of TM polarized light 74 without substantially affecting TE polarized light 72, in accordance with one embodiment of the present invention. In one example as shown in FIGS. 5A-B, FIGS. 6A-B, and in FIGS. 7A-B the liquid crystal molecules 38 are aligned (for example, through the use of alignment layers 40,41) such that when no voltage 46 is applied (FIGS. 5A and 6A), the longitudinal axes of the liquid crystals 38 are substantially parallel to both the plane of the waveguide 90 and the direction of light 66 propagation. In other words, the out-of-plane tilt angle and the in-plane angle are approximately zero or small.

In this example, as voltage 46 across the electrodes 42,44 is increased (FIGS. 5B and 6B), the liquid crystal molecules 38 will rotate upright, or stated differently, will rotate in a plane defined by the normal to the waveguide 90. This effect is further depicted in FIGS. 7A-7B which show a sectional view of the waveguide 90 of FIGS. 5-6. In FIG. 7A, when no voltage 46 is applied, the liquid crystals 38 are biased or initially positioned such that their short axes are generally perpendicular to the waveguide 90 plane; and in FIG. 7B, when a voltage 46 is applied, the liquid crystals 38 orient such that their longitudinal axes generally are perpendicular to the waveguide 90 plane, thereby providing an out-of-plane tilt angle that is approximately ninety degrees or generally large.

Figure 5B:
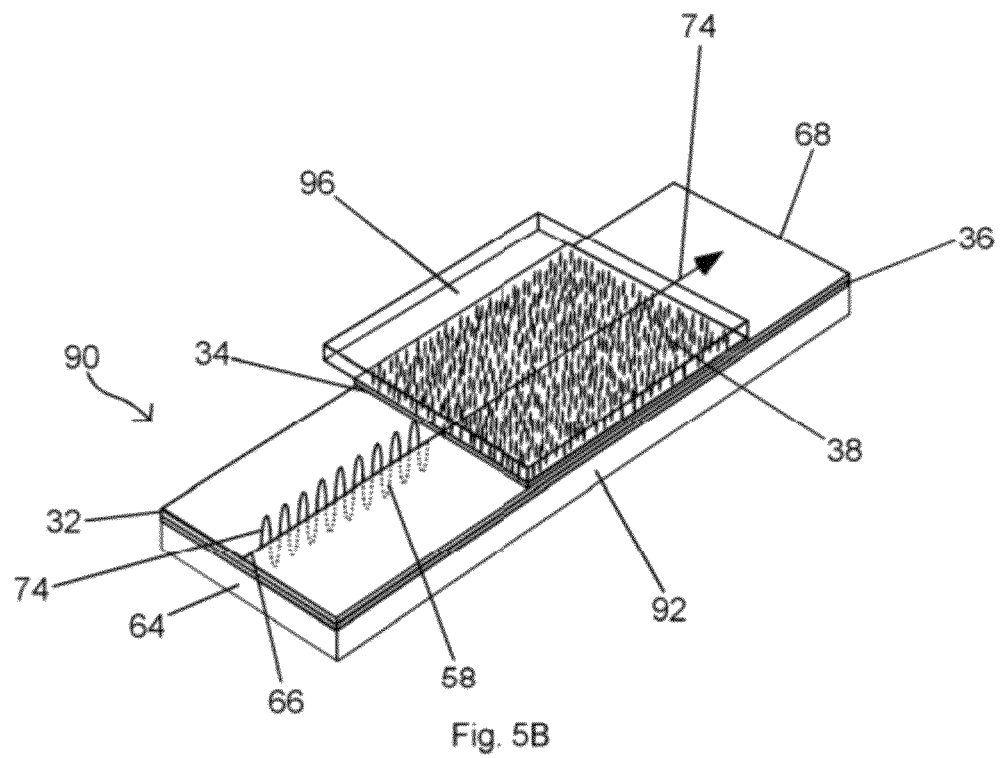
Figure 6A:
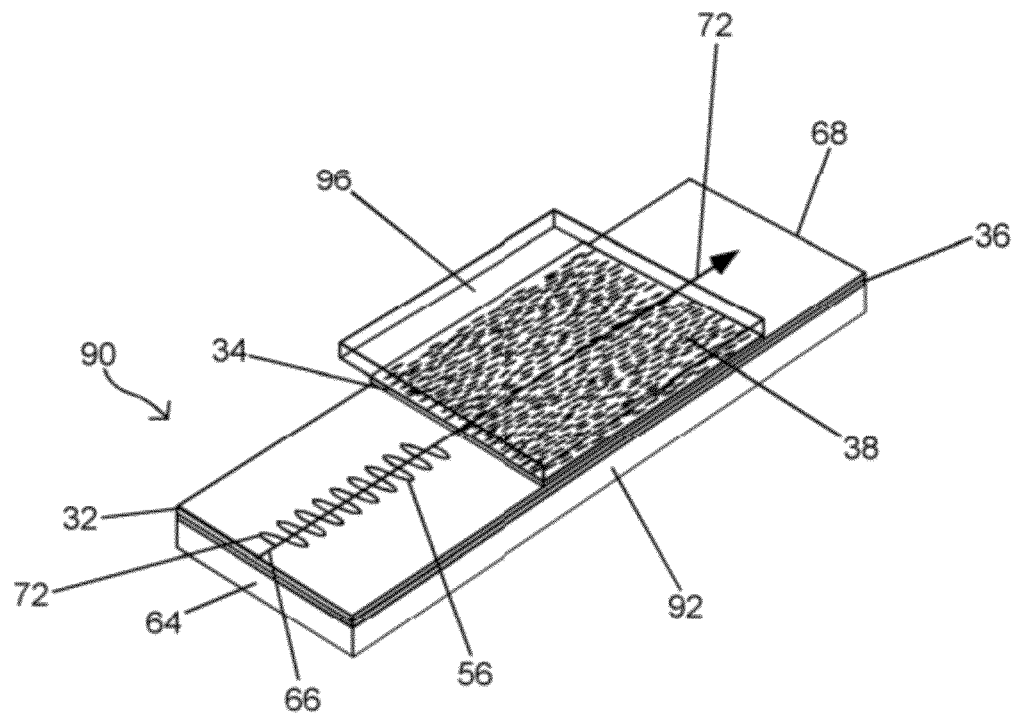
FIGS. 6A-B illustrate the waveguide of FIGS. 5A-B wherein the waveguide has liquid crystals aligned for providing active control of TM polarized light propagation (TE light is shown) as voltage is applied to an electrode in the waveguide, in accordance with an embodiment of the present invention.
Figure 6B:
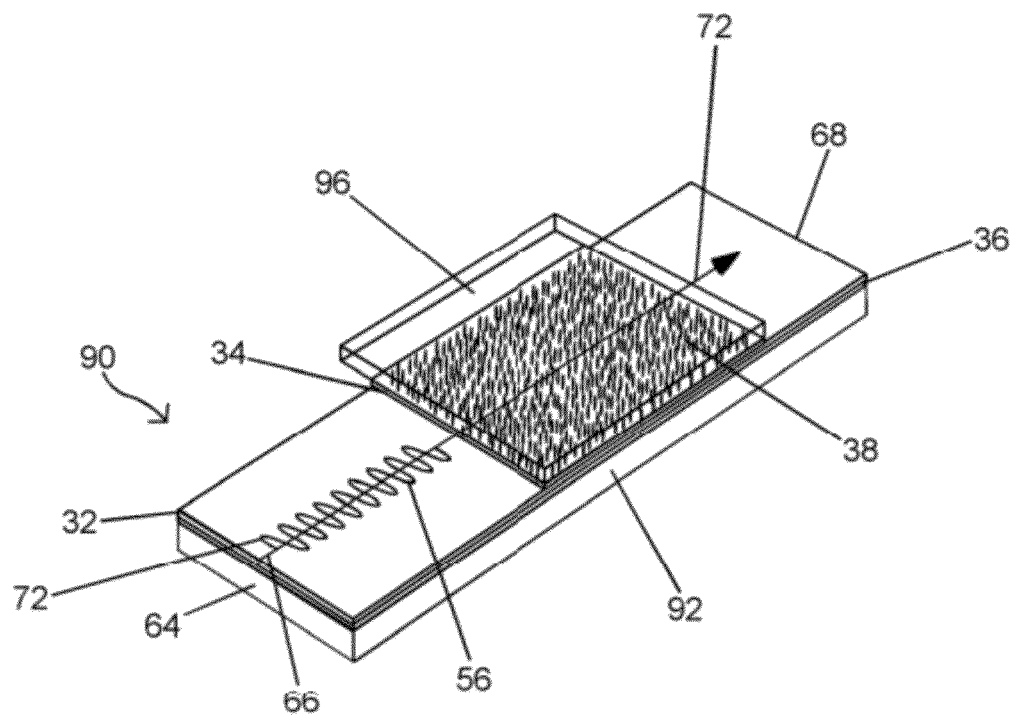
Figure 7A:
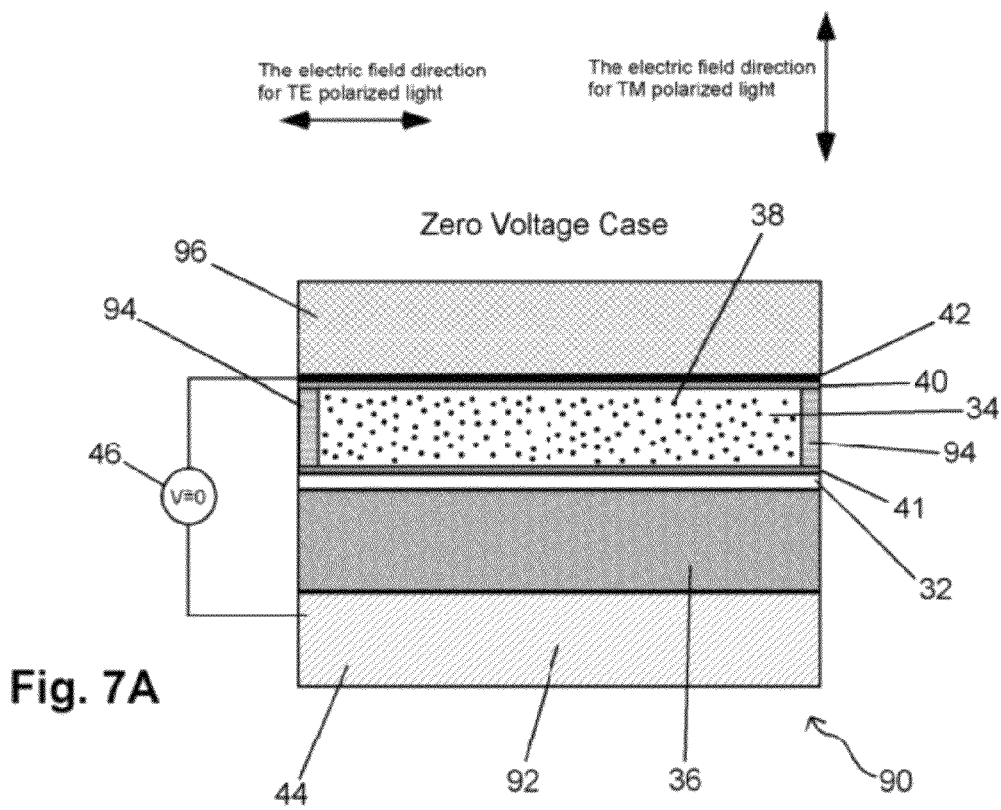
FIG. 7A illustrates a sectional view taken along section lines 7-7 of FIG. 1 for providing active control of TM polarized light propagation, where no voltage is applied across the electrode, in accordance with an embodiment of the present invention.
Figure 7B:
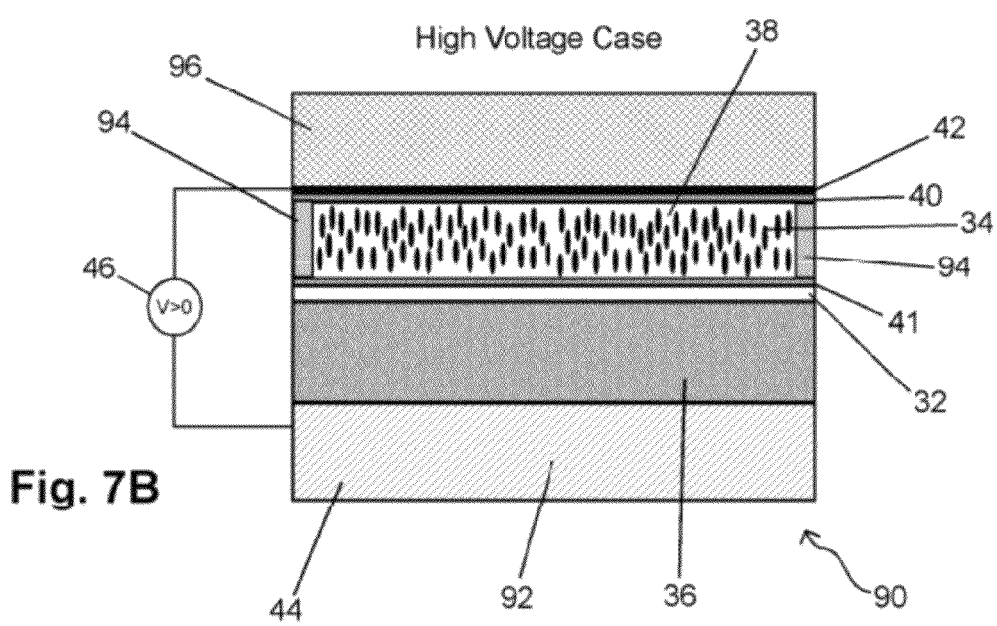
FIG. 7B illustrates a sectional view taken along section lines 7-7 of FIG. 1 for providing active control of TM polarized light propagation, where a voltage is applied across the electrode, in accordance with an embodiment of the present invention.

By rotating the liquid crystals 38 upwardly as shown in FIGS. 5B and 6B by the application of voltage 46 to the electrodes 42,44, TM polarized light 74 traveling through the waveguide 90 will experience a greater effective index of refraction/greater OPD/greater OPL, while TE polarized light 72 will not experience any significant change in the effective index of refraction/OPD/OPL.

In FIG. 5A-5B, a representation of the electric field vector 58 for TM polarized light 74 is shown. This TM electric field 58 is substantially normal to the plane of the waveguide 90. In this example, when no voltage 46 is applied (FIG. 5A), the electric field 58 of the TM polarized light 74 is substantially perpendicular to the longitudinal axes of the liquid crystal molecules 38, and accordingly TM polarized light 74 initially experiences relatively low effective index of refraction/OPD/OPL in this state.

As voltage 46 across the electrodes 42,44 is increased (FIG. 5B) and the liquid crystal molecules 38 rotate upright in a plane defined by the normal to the waveguide 90, thereby increasing the out-of-plane tilt angle, this will increase the effective index of TM polarized light 74 because the longitudinal axes of the liquid crystal molecules 38 will have an increasing projection along the electric field 58 of the TM polarized light 74.

In this manner, the optical phase delay/optical path length/effective index of refraction of TM polarized, light 74 may be dynamically increased by increasing the applied voltage 46, and the optical phase delay/optical path length/effective index of refraction of TM polarized light 74 may be dynamically decreased by decreasing the applied voltage 46 or disabling application of the voltage 46 across the electrodes 42,44.

As shown in FIGS. 6A-B, TE polarized light 72 will not experience any significant change in the effective index of refraction/OPD/OPL. In FIGS. 6A-B, the electric field 56 for TE polarized light 72 is substantially in and parallel to the plane of the waveguide 90.

In this example, when no voltage 46 is applied (FIG. 6A), the electric field 56 of the TE polarized light 72 is substantially perpendicular to the longitudinal axes of the liquid crystal molecules 38, and accordingly TE polarized light 72 initially experiences relatively low effective index of refraction/OPD/OPL in this state.

As the liquid crystal molecules 38 rotate upright in FIG. 6B, thereby increasing the out-of-plane tilt angle, the electric field 56 of the TE polarized light 72 will remain largely perpendicular to the longitudinal axes of the molecules 38, and accordingly TE polarized light 72 will not experience any significant change in the effective index of refraction/OPD/OPL.

FIGS. 4A-B and 7A-B illustrate sectional views of a waveguide (see 30 of FIG. 1) in accordance with one embodiment of the present invention. As shown in FIG. 4A, in one example, a waveguide may include a substrate 92 such as a P-doped silicon substrate or any other conductive material, which provides structural support for the waveguide and also can act as a lower electrode or ground plane 44 to which a voltage 46 may be applied. The substrate 92 may also be formed from any metal, such as silver, copper, aluminum, gold, titanium, etc. Alternatively, the substrate 92 can be nonconductive, such as a glass or crystal, and a conductive coating, or electrical ground plane can be applied to the top of the substrate 92 surface, between the substrate 92 and lower cladding 36. This conductive coating can be ITO, Au, Ag, Al, Cu, or any other of a number of conductive coatings. If the substrate 92 is constructed from Si, then circuitry can be directly integrated into the substrate if desired.

A lower cladding layer 36 may be provided on the substrate 92 and is preferably made of any dielectric materials with low absorptions whose index of refraction is less than the index of refraction of the core 32. Suitable materials include Silicon OxyNitride, Silicon-Rich Nitride, Silicon Nitride, Tantalum Pentoxide, Polymers, Pure Silicon, Ion exchange glass on substances such as Lithium Niobate, Sol-Gel, thermally oxidized silicon, glass, quartz, fused silica, etc. Alternatively, the lower cladding 36 may be comprised of a layer stack. Specifically, the lower cladding layer 36 may be constructed from thin layers wherein each layer has a different index of refraction than the layers adjacent to it, for example, interspersed layers of silicon nitride, silicon dioxide and/or silicon oxynitride. Alternately, the sub-layers may be constructed via an ion beam sputtering process, for example, intermixed $SiO_2$ and $Ta_2O_5$ layers. If these sub-layers are suitably thin enough then the overall layer stack may serve as the lower cladding 36.

In one example, the interface between the lower cladding 36 and the core layer 32 is transparent so that light can penetrate the lower cladding 36 as it propagates through the core 32. On top of the lower cladding 36, a waveguide core or core material 32 may be provided. In one embodiment, the core 32 does not include any liquid crystal material 38 therein. The core 32 may be made of materials such as any dielectric materials with low absorptions whose index of refraction is greater than the index of refraction of the upper and lower claddings. Suitable materials include, but are not limited to, Silicon OxyNitride, Silicon Rich Nitride, Silicon Nitride, Tantalum Pentoxide, Polymers, Pure Silicon, Ion exchange glass on substances such as Lithium Niobate, Sol-Gel, thermally oxidized silicon, glass. The index of refraction for the core may be higher than the index of refraction of the cladding, for example, the index of refraction of the core may be 1.55 or higher. Alternatively, the core 32 may be comprised of a layer stack. Specifically, the core layer may be constructed from thin layers each with their own index of refraction, for example, alternate layers of silicon nitride, silicon dioxide and/or silicon oxynitride. Alternately, the sub-layers may be constructed via an ion beam sputtering process, for example, intermixed $SiO_2$ and $Ta_2O_5$ layers. If these sub-layers are suitably thin enough then the overall layer stack may serve as the core 32.

As an alternative embodiment the core 32 and lower cladding 36 may be constructed in a manner such that the index of refraction varies continuously from the top of the core 32 to the bottom of the lower cladding 36. In this case, it is understood that the core 32 can include the upper region with the higher index of refraction, and the lower cladding 36 can include the lower region with the lower index of refraction. In other words, the transition from the higher index of refraction core 32 to the lower index of refraction cladding 36 may not be discrete, but rather may be a continuous or smooth transition. Furthermore, the index of refraction may vary across the thickness of the core 32 and across the thickness of the lower cladding 36. For example, a core 32 and lower cladding 36 may be constructed from an ion exchange process on a substrate, yielding an index of refraction profile that varies from a higher value at the top or edge of the substrate, to a lower value at a depth within the substrate. In this case, this single region of varying index of refraction serves as both the core 32 and lower cladding 36.

In one example, the core 32 has a thickness that is tapered or includes a channel. Furthermore, a core 32 may have a constant index of refraction, such as 1.55 or higher, along, the length of the waveguide 30, or alternatively have an index of refraction that varies across or along the device. On top of the core layer 32, an alignment layer (shown as the lower alignment layer 41 in this example) may be provided which is used to initially align or bias the orientation of liquid crystal material 38 that is proximate to or adjacent to the alignment layer 41 and the core 32. Alignment can be achieved, for example, by buffed polyimide, nylon, or other polymer coating applied to the core and or the cover plate, photo-aligned polyimide, polymer or other photo-aligned material, angle deposited SiO, SiO2 or other angle deposited material, microgrooves etched into the core and or cover plate, ion-buffed surfaces on the core or lower cladding, a dispersed polymer matrix that is photoaligned, or direct buffing of either surface. In one example the alignment layer or layers 40, 41 may include a coating that induces a homeotropic alignment in the liquid crystal. In another example the alignment layer or layers 40, 41 may include a coating that induces a homogeneous alignment in the liquid crystal 38. In one example, the lower alignment layer 41 is generally transparent.

On top of the lower alignment layer 41, the upper cladding 34 may be provided having liquid crystal material 38 therein, in this example. In one example, the interface between the lower alignment layer 41 and the upper cladding 34 is transparent. The liquid crystal material 38 may include, but is not limited to nematic gels, nematics with a polymer network (i.e., the liquid crystal itself is a cross-linkable polymer), or any nematic liquid crystal with either a positive dielectric constant or a negative dielectric constant or a mixture of each, polymer dispersed liquid crystal material, Smectic A* and C* liquid crystal material, discotic liquid crystal material, cholesteric liquid crystal material such as ferroelectrics and surface stabilized ferroelectrics, or dual-frequency liquid crystal material, for example. The liquid crystal material may also be a high viscosity material, or be doped with larger molecular weight materials to increase the viscosity. The liquid crystal material may possess any number of a variety of crystal symmetries, for example uniaxial, biaxial, or others. Furthermore, throughout this description, the "short" and "long" or "longitudinal axes" may also refer in general to the liquid crystal director orientation. While the various Figures herein show the liquid crystal material 38 as being nematic liquid crystal with a positive dielectric anisotropy, it is understood that embodiments of the present invention may utilize other types of liquid crystal material 38.

In one example, the upper cladding 34 may be formed using spacer material to define a region or volume wherein liquid crystal material 38 may be contained therein, and optically transparent glue such as Norland 68 may be used to create transparent boundary walls 94 to contain the liquid crystal 38.

On top of the upper cladding 34, an upper alignment layer 40 may be provided to initially align or bias the orientation of liquid crystal material 38 that is adjacent to or proximate to the upper alignment layer 40. As with the lower alignment layer 41, alignment can be achieved, for example, by buffed polyimide coating applied to the core and or the cover plate, photo-aligned polyimide, buffed nylon, buffed PVA, other buffed polymer layers, angle deposited SiO and or SiO$_2$, microgrooves etched or otherwise formed into the core and or cover plate, ion-buffed surfaces on the core or lower cladding, a dispersed polymer matrix that is photoaligned, or, direct buffing of either surface. In one example, the upper alignment layer 40 is generally transparent.

The alignment of the liquid crystal 38 between the lower and upper alignment layers 41,40 can be anti-parallel, parallel, twisted, or hybrid between twisted and parallel or anti-parallel. The direction of liquid crystal 38 alignment can be at any angle, with respect to the direction of light propagation. Illustrated in FIGS. 4A-B is an alignment layer 41,40 that provides for the longitudinal axis of a nematic liquid crystal 38 to be oriented perpendicular to the direction of light propagation (light is propagating into the plane of the page), thereby providing an in-plane angle of approximately ninety degrees or generally a large value.

On top of the upper alignment layer 40 and below the glass cover 96, an electrode layer 42 or portions of the electrode layer 42 may be provided. In one example, the electrode layer 42 is a conductive coating applied to the bottom surface of the glass cover 96. The conductive coating can include, but is not limited to, ITO, Au, Ag, Al, Cu, or any other conductive coating.

In another example, the electrode 42 can be p-doped silicon or any metal, such as silver, copper, aluminum, gold, titanium, alloys, or other conductive material, etc.

The shape of the electrode 42 can be generally rectangular, square, parallelogram or other shape such as disclosed in the co-pending, commonly owned patent application incorporated by reference above.

In one example, a glass cover 96 may be used (optional) and can be made of materials such as, but not limited to, standard display glass such as Corning 1737, fused silica, or any flat surface. Since the evanescent portion of the light does not pass through the cover 96, the cover 96 can be made from non-transparent materials such as silicon wafers, ceramics, or polished metal surfaces. In another embodiment, the cover 96 may be a metal or any other conductive material and serve as the upper electrode 42.

Using the structure of FIGS. 1-7 or variations thereof, various different waveguides 30,80,90 can be formed to selectively and controllably alter the index of refraction for both TE and TM polarized light 72,74 as it passes through the waveguide 30,80,90. When a voltage 46 is applied between the electrode(s) 42 and the substrate 92, an electric field is formed between the electrode 42 and the substrate 96, which induces movement of the liquid crystals 38 in the upper cladding 34 that are subject to the applied electric field. As the liquid crystals 38 move or change their orientation based on the applied voltage 46, the index of refraction of the upper cladding 34 is controllably changed. This can be used to alter the effective index for TE polarized light 72, TM polarized light 74, or both simultaneously.

Preferably, the core layer 32 is surrounded by an upper and lower cladding 34,36, wherein the interfaces between the lower cladding 36 and the core layer 32 and between the upper cladding 34 and the core layer 32 are transparent. As light 66 enters the core layer 32 and propagates through the core 32 along the length of the waveguide 30, 80, 90, the evanescent portion of the propagating light waves penetrate into both the upper and lower cladding 34,36. Preferably, the core layer 32 has a fixed index of refraction, and the lower cladding 36 also has a fixed index of refraction. By providing liquid crystal material 38 within the upper cladding 34, a portion of which is controllably subjected to an electric field between the electrode 42 and the substrate 92, the index of refraction of the upper cladding layer 34 can be controllably altered. Stated differently, the average index of refraction (also referred to herein as the effective index of refraction) of the upper cladding 34, core 32, and lower cladding 36 as experienced by a single TM or TE mode of light 66 in the waveguide 30 can be controllably altered by altering the index of refraction of the upper cladding 34. Hence, as light 66 passes through the waveguide core 32 and upper 34 and lower 36 cladding, the optical phase delay of the light can be controllably altered.

Because the liquid crystal material 38 is disposed within the upper cladding 34 and interacts primarily with the evanescent portion of the light wave and the fundamental portion of the light wave passes through the core 32 material, there is no significant attenuation of the intensity of the light 66 as the light 66 passes through the waveguide 30, 80, 90, which permits the length of the waveguide 30, 80, 90 to be beneficially long to allow large control over the optical phase delay. Conversely, if desired, the upper cladding 34 may have a fixed index of refraction and the lower cladding 36 may be provided with liquid crystal material 38 therein.

Furthermore, the evanescent portion of the light 66 is, in general, only interacting with the liquid crystal molecules 38 that are close to the alignment layer 41. These molecules are more highly ordered than liquid crystal molecules further away from the alignment layer 40,41 and therefore scatter less light. In one example, the losses are sufficiently low (e.g., less than 0.5 dB/cm) that the waveguide length can be lengthy (e.g., 4 inches or greater).

While FIGS. 1-7 show particular arrangements of layers of a waveguide according to one embodiment of the present invention, it is understood that the present invention contemplates variations of this arrangement. For instance, the conductive lower electrode 44 may be positioned at different layers within the waveguide if desired. Further, while two alignment layers 40,41 are shown, it is believed the invention may be implemented using a single alignment layer. While the liquid crystal material 38 is shown as disposed within the upper cladding 34, it is understood that the liquid crystal material 38 may be disposed in the lower cladding 36 if desired.

It its understood that the embodiments of FIGS. 2-7 may be used, if desired, to control polarized light such as TE or TM light. In another example, light that is polarized at 45° with respect to the plane of the waveguide may be introduced into a waveguide 30, 80, 90 in accordance with embodiments of the invention. This light may be expressed as equal TE and TM components that are exactly in phase. As the light travels through the waveguide 30, 80, 90, the different indices of refraction for the TE and TM components will create an optical phase delay between the two components. As the applied voltage 46 is controllably altered, the optical phase delay between the TE and TM components can be controllably altered.

In the embodiments of FIGS. 2-3, since with application of voltage 46 the TE index decreases while the TM index increases, the total optical phase delay can be altered to a greater extent than if only one of the indices were altered. In this manner, the optical phase delay between TE and TM polarization that may be realized is greater than the optical phase delay of only the TE component or only the TM component.

Another method of achieving TE modulation in a waveguide geometry similar to FIGS. 1-7 is to use smectic liquid-crystal materials 38 exhibiting the electroclinic effect. These materials may rotate about an axis containing the applied electric field vector, altering the effective index of TE light while leaving the effective index of TM polarized light relatively unaffected. In other words, the in-plane rotation angle may be controllably altered without substantially altering the out-of-plane tilt angle.

Figure 8:
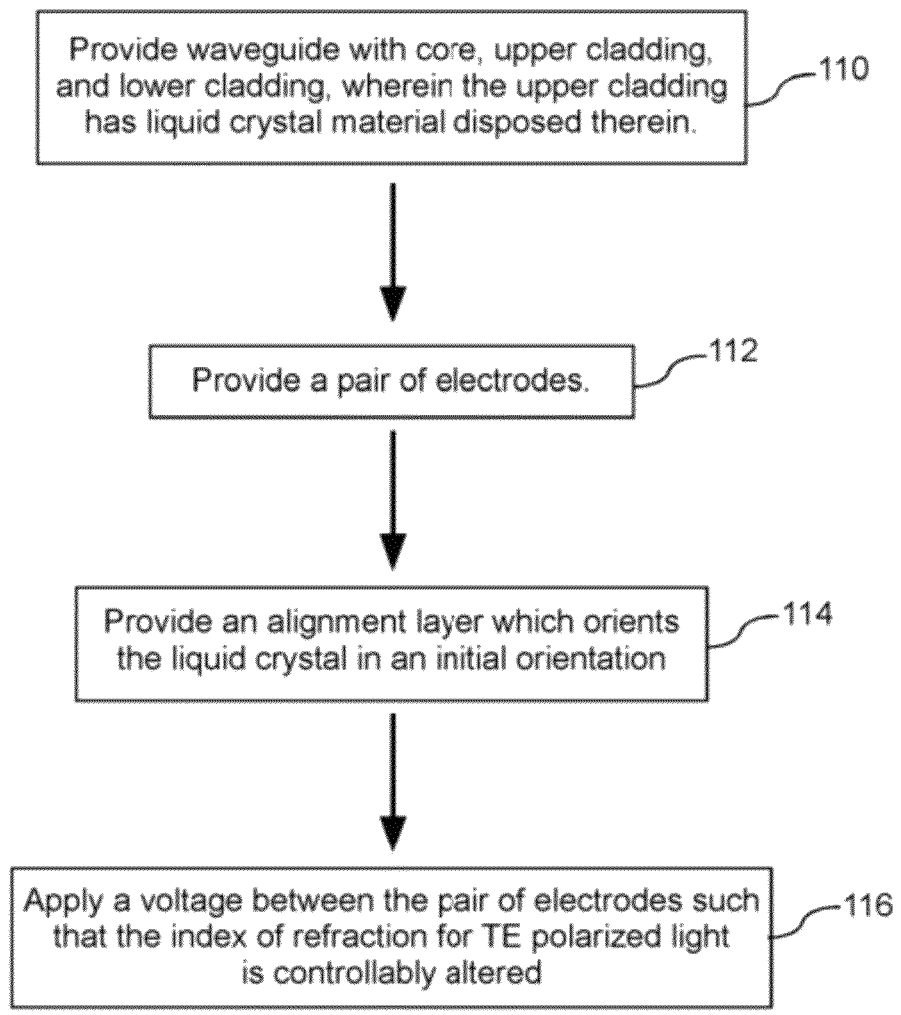
FIG. 8 illustrates an example of operations for controlling the propagation of TE polarized light through a waveguide, in accordance with one embodiment of the present invention.

FIG. 8 illustrates an example of operations for controlling the index of refraction of TE polarized light through a waveguide, in accordance with one embodiment of the present invention. At operation 110, the waveguide is provided with a core, an upper cladding, and a lower cladding where in one example the upper cladding has liquid crystal material disposed therein. Alternatively, liquid crystal material may be disposed within the lower cladding if desired. At operation 112, a pair of electrodes is provided for controlling the orientation of the liquid crystal material proximate the electrode pair. In one example, a substrate material of the waveguide is electrically conductive and acts as a lower electrode or ground plane so that a controlled voltage can be applied between the upper electrode and the substrate to create an electric field therebetween.

At operation 114, at least one alignment layer is provided to align the liquid crystal material proximate the core. For instance, a lower alignment layer (such as 41 in FIGS. 4A-B) can be provided to initially align or bias the liquid crystals within the upper cladding and adjacent to the lower alignment layer. By providing the alignment layer, the liquid crystal material responds to an applied voltage in a faster and more orderly and predictable manner. Further, when no voltage is applied to the liquid crystal material, the alignment layer provides sufficient liquid crystal ordering to minimize scattering of the light propagating through the waveguide because the evanescent portion of the light interacts primarily with the highly ordered liquid crystal molecules along the alignment layer.

In one example, operation 114 provides an initial alignment/orientation of liquid crystal molecules in the plane of the waveguide, with zero or small out-of-plane tilt angle, and perpendicular to the propagation direction of light, with ninety degrees or a large value for the in-plane angle. In another example, operation 114 provides an initial alignment/orientation of liquid crystal molecules in the plane of the waveguide, with zero or a small out-of-plane tilt angle, and parallel to the propagation direction of light, with zero or a small in-plane angle. In another example, operation 114 provides an initial alignment/orientation of liquid crystal molecules perpendicular to both the plane of the waveguide and the propagation direction of light, i.e., both the out-of-plane tilt angle and the in-plane angle are approximately ninety degrees or generally a large value.

At operation 116, a voltage is applied between the pair of electrodes in order to change the effective index of refraction for TE polarized light. By altering the refraction of the liquid crystal material between the electrode pair a modulation index or change in the index of refraction for TE polarized light is achieved. As the modulation index increases, the amount of optical phase delay for TE polarized light also increases, which permits active, solid state control of the optical path length of TE polarized light passing through the waveguide.

Figure 9:
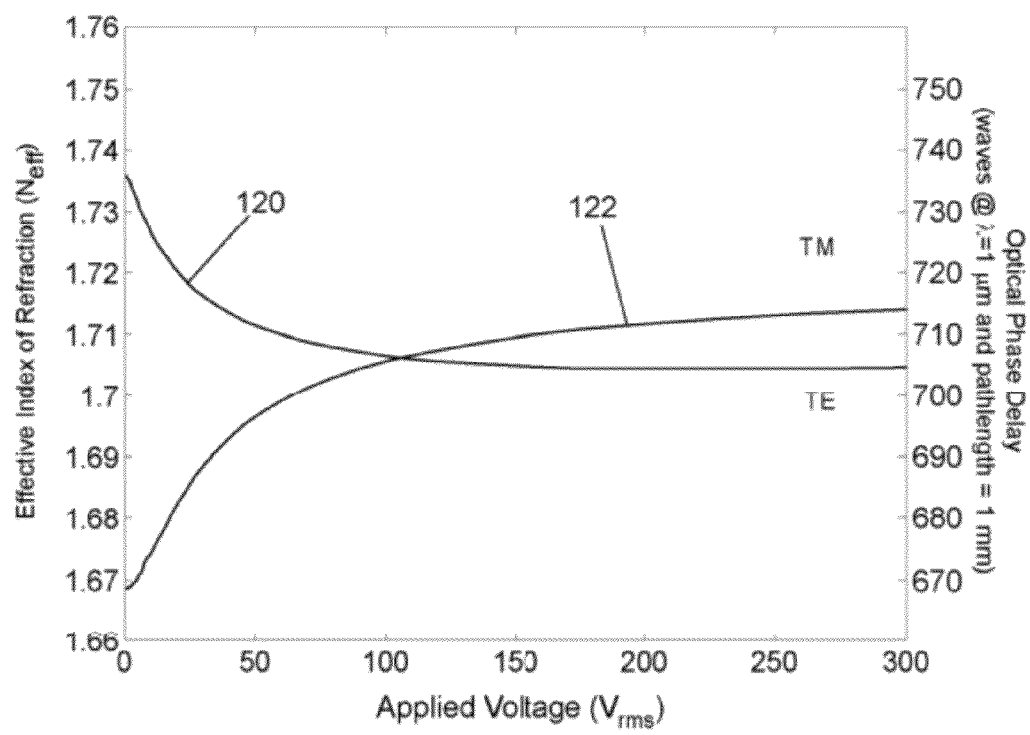
FIG. 9 illustrates changes in effective indexes of refraction (left scale) and optical phase delays (right scale) for TE and TM light for an example of a waveguide wherein the indices are equal at a certain applied voltage, in accordance with one embodiment of the present invention.

FIG. 9 shows an example graph where the effective indexes of refraction for TE and TM polarized light converge at a given voltage. In another example of the present invention, the dimensions and, thickness of the waveguide layers may be chosen such that the TE and TM indices of refraction 120,122 are not substantially different.

Also shown in FIG. 9 is the optical phase delay for TE and TM polarized light. The optical phase delay that is plotted in FIG. 9 is the difference between the optical phase of light that has traveled through 1 mm of free space, wherein the index of refraction is equal to one, and the optical phase of light that has traveled through 1 mm of waveguide, wherein the index of refraction may be controlled with a voltage. In this example, the wavelength of light is 1 μm, and the optical phase delay is plotted in waves. Furthermore, for this example, at voltages of less than approximately 100 volts, the optical phase delay of TE polarized light is greater than the optical phase delay of TM polarized light. In the region of approximately 100 volts the optical phase delay of TE polarized light is similar to the optical phase delay of TM polarized light. For voltages greater than approximately 100 volts the optical phase delay of TM polarized light is greater than the optical phase delay of TE polarized light, in this example.

The difference between the TE effective index 120 and the TM effective index 122 is referred to as the waveguide birefringence. Contributions to the birefringence include the geometric birefringence, due to the waveguide geometry, and material birefringence, such as the birefringence of the liquid crystal.

The geometric birefringence arises from the asymmetry that is typically inherent to planar or channel waveguides. Generally, the smaller the waveguide dimensions, such as the thickness of the core layer, the larger the geometric birefringence, and vice versa. For example, if the waveguide core were very thick (e.g. much thicker than the wavelength of light) then the core would appear to the light as a bulk material. In other words, for light that is guided within a planar core the dimensions out of the plane of the waveguide would appear similar to dimensions in the plane of the waveguide. In this case, the geometric birefringence would be relatively small. Alternatively, if the core thickness of a planar or slab waveguide were sufficiently small (e.g. less than a wavelength of light) then the geometric birefringence would be larger. This may be qualitatively understood since this thinner core would then appear very different in one dimension (e.g., out of the plane of the waveguide) as compared to another dimension (e.g., in the plane of the waveguide).

In another example, the geometric waveguide birefringence may be controllably altered by choice of indices for the waveguide layers. For example, if the core layer is chosen to have a substantially different index than either the lower or upper cladding layers, then the geometric birefringence is generally increased. The difference between, the core and cladding indices may be referred to as the index contrast. For a higher index contrast waveguide, the light is more tightly confined, and therefore the asymmetry between the out-of-plane dimension (tight confinement) and the in-plane dimension (no confinement for a slab and weak confinement for a channel) is greater. The geometric birefringence is therefore commensurately greater as well. Alternatively, a lower index contrast waveguide will provide a lower geometric birefringence.

Therefore, the magnitude of the waveguide geometric birefringence may be controllably altered by choice of waveguide dimensions and indices.

The material birefringence arises from the birefringence of the different waveguide layers. This birefringence may be independent of waveguide dimensions. For example, the liquid crystal cladding layer has a material birefringence that is not generally dependent on the thickness of any of the waveguide layers. Rather, the material birefringence of the liquid crystal cladding layer may be dependent on the direction of liquid crystal alignment, i.e., the magnitude of the out-of-plane tilt angle and the in-plane angle, and the magnitude of applied voltage.

The material birefringence may be of the same sign as the geometric birefringence, or it may be of the opposite sign. If the material birefringence is of the same sign, then it will add to the geometric birefringence and increase the total waveguide birefringence. Alternatively, if the material birefringence is of the opposite sign as the geometric birefringence, then it will subtract from the material birefringence and lower the total waveguide birefringence. The waveguide can be designed for a sufficiently small geometric birefringence, for example, by increasing the core thickness or decreasing the core index relative to the cladding indices. In such cases there may be a voltage at which the material birefringence of the liquid crystal material can cancel the geometric birefringence, and the TE index 120 will equal the TM index 122.

Shown in FIG. 9 are theoretical calculations for the voltage dependence of both the TE and TM modes in an LC waveguide where the liquid crystal is aligned parallel to the waveguide surface (homogeneous) but perpendicular to the direction of light propagation. The calculations are for a slab or planar waveguide with a core index of 1.85 and a lower cladding index of 1.45. The calculation wavelength is 1.55 microns. The core thickness is 600 nanometers. The liquid crystal is MLC6621, which is available from Merck Chemical Co. The pretilt, which is the initial out-of-plane tilt angle, of the LC was set to 3 degrees, and a surface anchoring energy of $1\times10^{-3}$ erg/cm$^2$ was used, both of which are suitable for a buffed polyimide alignment. The director profile as a function of voltage was calculated, and at each voltage the effective index of the zeroth guided mode was calculated for both the TE and TM modes. In this example, for voltages near 100 volts the TE and TM modes have the same or nearly the same effective index.

When two modes within a waveguide (e.g., TE and TM) have the same or nearly the same effective index, they may be referred to as phase matched or momentum matched. In this case, energy may flow from one mode into the other (i.e., from TM into TE, or from TE into TM). For the example of FIG. 9, at voltages near approximately 100 volts, the TE mode and the TM mode are phase or momentum matched, and therefore energy may flow from one to the other. This may be used as a voltage controllable TE-to-TM or TM-to-TE mode converter. To ensure that a mode-conversion voltage exists, the waveguide may be designed such that the geometric birefringence is sufficiently small enough (i.e., through either a lower index contrast waveguide or a thicker core layer, or a combination of both) and the material birefringence of the liquid crystal cladding is sufficiently large enough such that a voltage exists wherein the material birefringence is of the same magnitude but opposite sign to the geometric birefringence.

Figure 10:
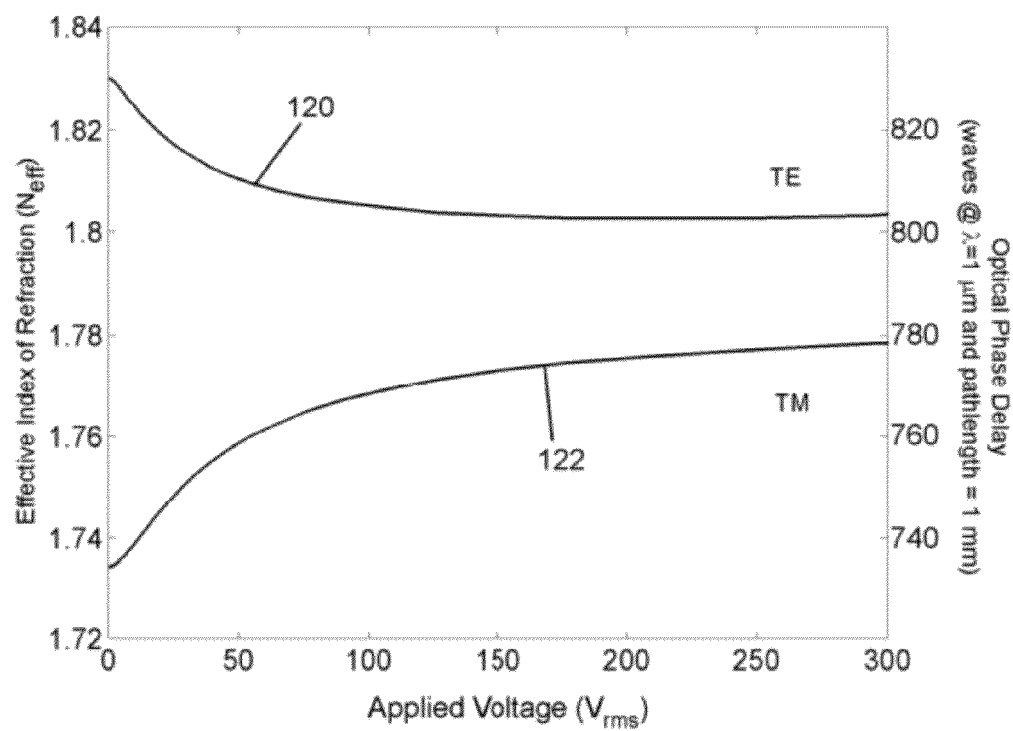
FIG. 10 illustrates changes in effective indexes of refraction (left scale) and optical phase delays (right scale) for TE and TM light for an example of a waveguide wherein the indices are never equal regardless of applied voltage, in accordance with one embodiment of the present invention.

FIG. 10 illustrates an example graph where the effective indexes of refraction for TE and TM light do not converge. Also shown in FIG. 10 is the optical phase delay for TE and TM polarized light. The optical phase delay that is plotted in FIG. 10 is the difference between the optical phase of light that has traveled through 1 mm of free space, wherein the index of refraction is equal to one, and the optical phase of light that has traveled through 1 mm of waveguide, wherein the index of refraction may be controlled with a voltage. In this example, the wavelength of light is 1 µm, and the optical phase delay is plotted in waves. Furthermore, in this example, the optical phase delay of TE polarized light is always greater than the optical phase delay of TM polarized light.

Numerous applications are designed to work on only one polarization (e.g., TE or TM) and therefore TE-to-TM or TM-to-TE mode conversion is undesirable in such applications. Hence, in one embodiment, a waveguide may be formed so that TE-to-TM or TM-to-TE mode conversion is negligible. This may be accomplished by utilizing a liquid crystal waveguide structure such that for all voltages, the TE effective index is never equal to the TM effective index. Specifically, the geometric birefringence may be increased by either increasing the index contrast of the waveguide or decreasing the thickness of the core. As an example of a LC waveguide design that is free from a TE/TM phase matching voltage, FIG. 10 illustrates the theoretical effective indices of TE and TM light as a function of voltage, in a manner analogous to FIG. 9, except that the core index has been increased to 2 and the core thickness has been decreased to 500 nanometers. The calculations were conducted for light at a wavelength of 1550 nm. Since the geometric birefringence is greater than the material birefringence for all voltages, there is never any TE-to-TM or TM-to-TE mode conversion. In this way, a liquid crystal waveguide may be constructed that both (i) controllably and simultaneously alters the effective index for both TE and TM polarizations and (ii) preserves the amount of optical power in either the TE or TM mode. If only TE polarized light is input into the liquid crystal waveguide, then only TE light will emerge at the output, and likewise for TM polarized light.

In one example, to create a liquid crystal waveguide that is free of TE-to-TM mode conversion voltages and free of TM-to-TE mode conversion voltages, the geometric birefringence may be made to be suitably large (geometric birefringence may be increased either by increasing the index contrast of the waveguide, or by decreasing the thickness of the core layer, or a combination thereof) such that for a given liquid crystal birefringence, over an operational voltage range, the effective index for TE is always larger than the effective index for TM.

In the previous example the voltage tunable optical phase delay between TE polarized light and TM polarized light is increased by nearly a factor of two over a design that would only tune the TE optical phase delay or only tune the TM optical phase delay. In other words, as shown in FIG. 10, the effective index for TE polarized light 120 is decreased with increasing voltage whereas the effective index for TM polarized light 122 is increased with increasing voltage. This means that as the speed of propagation of TE polarized light is decreased, the speed of propagation of TM polarized is simultaneously increased. These effects add to provide for a larger TE vs. TM optical phase delay. This is beneficial for applications such as interferometry, Fourier transform spectroscopy, optical coherence tomography, and others. In these applications it is generally problematic to have TE-to-TM or TM-to-TE mode conversion. As discussed, this may be avoided by constructing the liquid crystal waveguide such that the waveguide geometric birefringence is larger than the waveguide material birefringence for all operational voltages.

EXAMPLE

Described below is one example of a liquid crystal waveguide in which the waveguide was designed to provide for increased tunability of the TE vs. TM optical phase delay, and this is described as an example only. Furthermore, the waveguide was designed such that for all voltages of operation, the geometric birefringence was larger than the material birefringence. It is understood that this example is provided for illustrative purposes only, and does not limit the scope of embodiments of the present invention. In one example, a waveguide device may be formed utilizing a heavily p-doped silicon wafer, with both sides polished, as the lower electrode. Upon the p-doped silicon wafer, a thermally oxidized lower cladding can be grown with a thickness of 2±0.05 microns.

The lower cladding refractive index at a wavelength of 1550 nanometers was 1.445±0.001 as measured by a broadband ellipsometer. A SiOxNy guide layer or core was applied over the lower cladding by plasma enhanced chemical vapor deposition to a thickness of 651 nanometers. The ratio of Ox to Ny in SiOxNy was adjusted during the deposition process to create a core with a refractive index of 1.9 at a wavelength of 633 nanometers. Identical coatings were applied to both sides of the wafer in order to balance stresses, and therefore mitigate warping or bending of the wafer. These stresses are a result of the plasma enhanced chemical vapor deposition process.

Once complete, the wafer was diced into smaller 10 millimeter by 25 millimeter parts. Each diced part was then coated with an alignment film approximately 120 angstroms in thickness. The alignment film was used to create the homogeneous orientation of the liquid crystal upper cladding. The film was produced by spin coating an 8:1 mixture of Nissan polyimide varnish solvent type 21 to Nissan polyimide Grade 2170 filtered at 0.2 microns at 3000 rpm. The same spin coating process was performed on the cover plate, which was made of 0.7 millimeter thick 1737 corning display glass coated on one side with an indium tin oxide (ITO) film to produce a 100 ohms/square conductive layer used for the upper electrode.

Once both the wafer and the cover glass were coated, the polyimide was imidized by baking in an oven at 200 degrees celsius for approximately 1 hour. The polyimide coatings were mechanically buffed with a dense piled cloth to induce preferential alignment perpendicular to the direction of light propagation in the waveguide. In other words, the buffing direction was chosen to provide for an initial liquid crystal orientation such that the in-plane angle between the longitudinal axes of the liquid crystal molecules and the direction of light propagation will be approximately ninety degrees or generally a large value. The liquid crystal upper cladding layer was formed by spacing the glass window from the diced wafer parts with 5-micron borosilicate glass spacers immersed in an ultra-violet curing adhesive Norland 68. Approximately 1-millimeter dots of the spacing mixture were placed at the four corners that created the cell gap for the liquid crystal to be disposed therein. The cover plate was attached to the rest of the waveguide so as to create an anti-parallel alignment layer between the cover glass and the waveguide core. Furthermore, this alignment layer adjacent to the waveguide core was such that the liquid crystals will be initially aligned in the plane of the waveguide (an out-of-plane tilt angle of approximately between three and five degrees) and perpendicular to the propagation of light (an in-plane angle of approximately ninety degrees), such as shown in FIG. 2A.

The cell gap was then exposed to 365 nanometer light until fully cured. Straight Norland 68 was used to backfill via capillary action the remaining exposed edges making up the cell gap. A one-millimeter opening, or fill hole, was left. E7 liquid crystal, obtained from Merck Chemical Co., was then introduced to the opening and allowed to fill the cell gap via a combination of capillary force and back pressure. The E7T liquid crystal, which is a positive dielectric nematic, is initially aligned substantially in the plane of the waveguide, with an out-of-plane tilt angle approximately between three and five degrees, and substantially perpendicular to the propagation of light, with an in-plane angle of approximately ninety degrees, such as shown in FIG. 2A. Once filled, the hole was plugged by using Norland UVS-91 visible-uv curing adhesive. Wires were then attached to the upper electrode and lower electrode using conductive epoxy.

Operation of the waveguide included coupling light into and out of the waveguide by means of end-fire coupling. Equal amounts of TE and TM light were introduced into the TE0 and TM0 modes of the waveguide. Amplitude modulated 5 KHz square-wave drive voltages were applied to change the optical phase delay between TM and TE polarized light. To measure this change in relative optical phase delay, a 45-degree polarizer was used to interfere the TE and TM light.

Table 1 shows experimental data of TE vs. TM optical phase delay (OPD) as a function of voltage. The liquid crystal interaction length was 2.9 cm long, with no appreciable loss detected. The liquid crystal was aligned perpendicular to the light propagation direction and in the plane of the waveguide (homogeneous). This liquid crystal orientation provides for simultaneous tuning of both the TE effective index and the TM effective index. A core index of 1.9 and a core thickness of 651 nm provide a geometric birefringence sufficient enough to avoid any TE-to-TM or TM-to-TE coupling voltages at light wavelengths of 1440 nm. No TE to TM coupling was observed. This was verified by inputting only TE light or only TM light and then monitoring the polarization state of the light output for all voltages. The voltage tunable optical phase delay at 175 volts was greater than 1 mm, which provides a viable replacement for mechanical mirror translation or other conventional light control means. With increased interaction length, for instance with a longer waveguide, this voltage tunable optical phase delay could be further increased.

TABLE 1

OPD achieved at various Voltages

| Voltage (RMS) | OPD between TE and TM modes | |
|---|---|---|
| | OPD in waves @ 1.44 μm | OPD in mm |
| 0.0000 | 0.0000 | 0.0000 |
| 4.2000 | 19.0000 | 0.0253 |
| 8.7000 | 98.0000 | 0.1303 |
| 22.6000 | 283.0000 | 0.3764 |
| 45.6000 | 458.0000 | 0.6091 |
| 90.0000 | 623.0000 | 0.8286 |
| 175.0000 | 752.0000 | 1.0002 |
| 325.0000 | 821.0000 | 1.0919 |

While FIGS. 1-10 illustrate examples of the present invention, it is understood that the principles of the present invention could be employed in other arrangements of liquid crystal waveguides, and such examples are illustrated in FIGS. 11-12, 13, 14, 15-16.

In FIGS. 11-12, an alternative embodiment of a waveguide 130 is illustrated in accordance with one embodiment of the present invention. This embodiment may be used to control TE polarized light (without significantly affecting TM polarized light).

In this example, the guided light 132 is confined to a channel 134 in the waveguide core layer 136, and a pair of electrodes 138,140 are placed adjacent to this channel 134 on opposing sides thereof and along the length of the channel 134 (rather than above and below the liquid crystal cladding 152). The channel 134 provides lateral guiding of the light 132, and may be formed by means of an inverted ridge or groove in the core layer 136. The channel 134 preferably extends along the length of the waveguide 130, and may generally define a rectangular slot or recess in the waveguide core layer 136.

The adjacent or side electrodes 138,140, which in one example may be generally rectangular, may be formed by depositing a thin conductive film, such as ITO, gold, aluminum, etc. and then photo-lithographically removing the conductive film in regions other than the desired side electrodes 138,140. The electrodes 138,140 may be placed sufficiently far away from the waveguide channel 134 so as not to attenuate the guided light 132. Application of voltage 142 on these electrodes 138,140 produces an electric field that is largely parallel to the surface of the waveguide 130 and perpendicular to the length of the channel 134 as well as perpendicular to the direction of light 132 propagation through the waveguide 130.

Figure 12A:
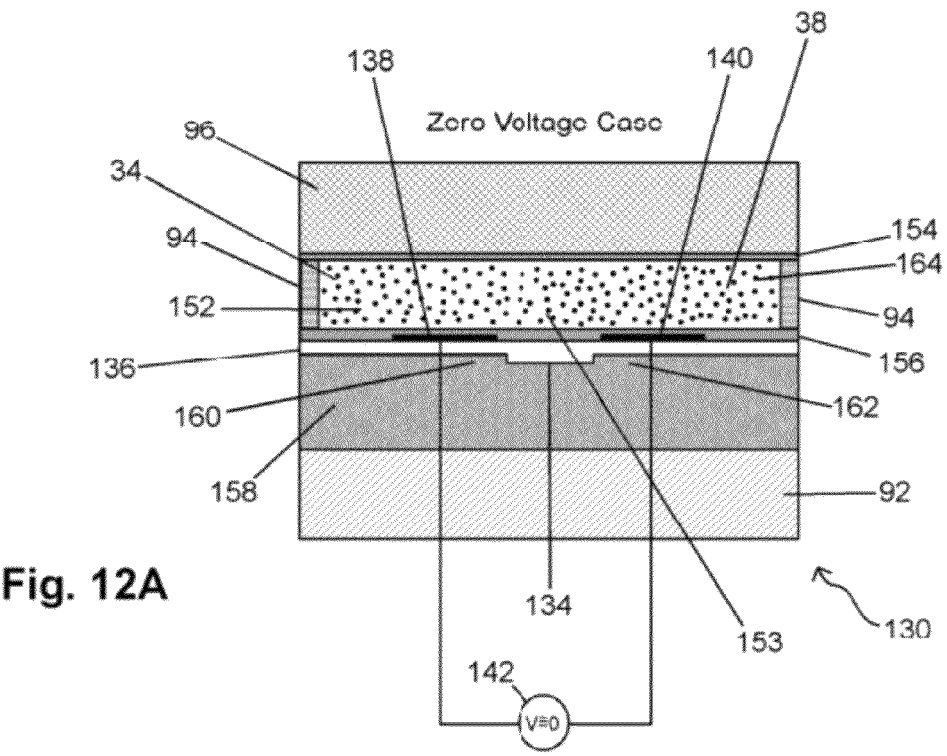
FIG. 12A illustrates a sectional view taken along section lines 12-12 of FIG. 11, wherein no voltage is applied across the electrodes of the waveguide, in accordance with an embodiment of the present invention.
Figure 12B:
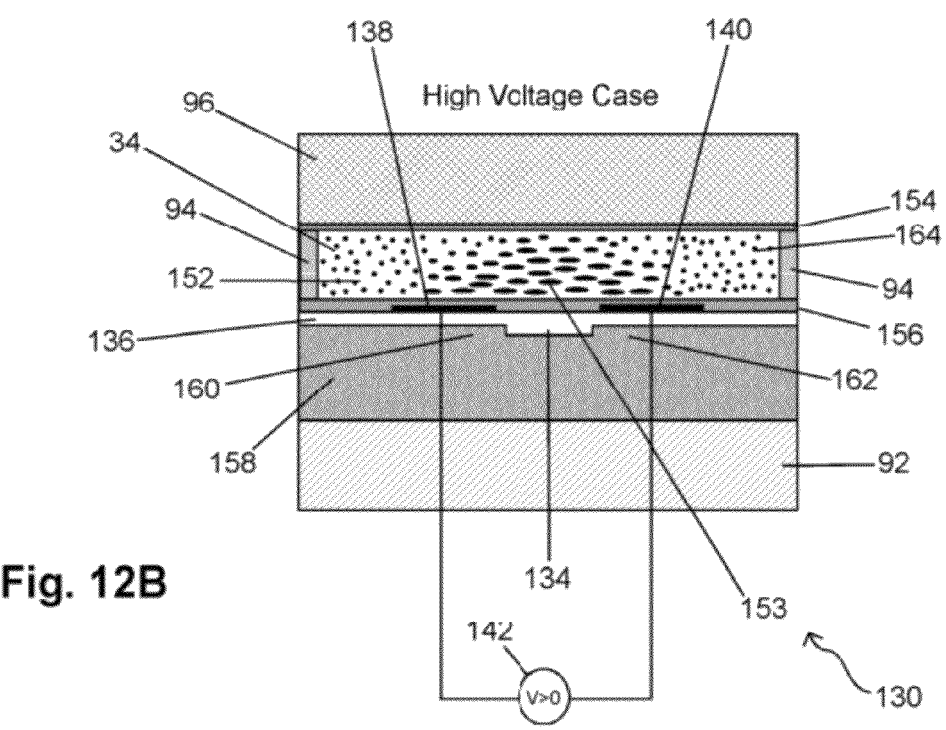
FIG. 12B illustrates a sectional view taken along section lines 12-12 of FIG. 11, wherein a voltage is applied across the electrodes, in accordance with an embodiment of the present invention.

FIGS. 12A-B show a cross-sectional view of the waveguide 130 of FIG. 11 taken along section lines 12-12. In FIGS. 12A-B, a positive dielectric nematic liquid crystal 152 has been initially aligned parallel to the light 132 propagation direction (FIG. 12A), thereby providing an in-plane angle of approximately zero or a generally small value. It is understood that other liquid crystals, such as Smectic C* or Smectic A*, could be utilized, in either a homeotropic or homogeneous alignment.

FIG. 12A illustrates the zero voltage 142 case, where both TE and TM polarized light see the short axis of the liquid crystal molecules 152. In this case, both TE and TM polarizations experience a relatively lower index of refraction (when compared to the case when voltage is applied in FIG. 12B).

FIG. 12B illustrates where a high voltage has been applied across the adjacent electrodes 140,142. In response to the applied voltage 142 and to align with the electric field, the liquid crystal molecules 152 are rotated in the plane of the waveguide 130 and perpendicular to the light propagation direction. In other words, the in-plane angle of the liquid crystal molecules 152 increases, whereas the out-of-plane tilt angle remains generally unaltered. The molecules 153 closest to the core layer 136 experience the strongest electric field, and therefore are rotated the most. These are also; the molecules 153 that are in the strongest portion of the evanescent field of the guided light. In this high voltage case, TE polarized light will experience a larger index of refraction. Alternately, the index for TM polarized light will not be substantially changed. In this way, the index of refraction and therefore the optical phase delay of TE polarized light can be independently controlled.

The construction of the waveguide 130 layers and alignment layers 154,156 may be the same as previously described. The construction of the inverted ridge channel 134 may be done via a variety of photolithography processes. In one example, the inverted ridge or channel 134 may be formed by a combination of thermal oxide, low pressure chemical vapor deposition, and ion beam sputtering. A layer of thermal oxide may be grown in a p-doped Si wafer. This layer may be four microns thick, or thick enough to serve as the lower waveguide cladding 158. On top of the thermal oxide a thin layer of silicon nitride may be deposited via low vapor pressure chemical vapor deposition. In one example, this layer may be 40 nm thick. This layer may then be etched away in a photo-lithographically determined pattern, such that all or part of the remaining silicon nitride layer may define the inverted ridge 134. Next, a layer of low vapor pressure silicon dioxide may be applied. This will define the side cladding 160,162 adjacent to the inverted ridge 134. At this point a chemical-mechanical-polish (CMP) may be performed to define a smooth top layer, upon which the slab portion or core layer 136 will be deposited. The slab portion 136 of the core 136,134 may be a tantalum pentoxide layer deposited by an ion beam sputtering process. The ridge 134 depth and width may be chosen to provide for single mode lateral guiding. For example, the ridge 134 depth may be 40 nm, and the width may be 3 microns. A top-hat or top-ridge channel geometry may be employed, although the topology of the channel may interfere with the liquid crystal 152 alignment, which may subsequently lead to larger scattering losses.

It is also understood that Smectic materials could be utilized in this embodiment. For example, Smectic C* or Smectic A* liquid crystals could be provided in a homeotropic alignment. Application of voltage 142 to the side electrodes 160,162 may then be used to provide for TM control.

In this embodiment of FIG. 12, the liquid crystals 152 are disposed within the upper cladding 164. It is understood that the liquid crystal material 152 could be disposed within the lower cladding 158, and if desired, the alignment layers 154, 156 could be placed on the upper and lower surfaces of the lower cladding 158 having the liquid crystal material 152 therein.

FIG. 13 illustrates an alternative embodiment wherein a waveguide 180 utilizes two sets of electrode-pairs (182,182 and 186,188) which are oriented with respect to one another such that the electric field created by a first pair of electrodes 182,184 is generally perpendicular to the electric field created by the second pair of electrodes 186,188, in accordance with one embodiment of the present invention. In the example of FIG. 13, a waveguide 180 can be constructed in a manner similar to the embodiments (such as FIGS. 11 and 12) described above except that the embodiment of FIG. 13 has an additional pair of electrodes 186, 188.

The waveguide 180 of the example of FIG. 13 may include a first electrode pair 186,188 including, an upper electrode 186 and a substrate 187 acting as a lower electrode plane 188 of the first electrode pair 186,188; a lower cladding 190; a core layer 192, which may include a channel 194 therein; an alignment layer; an upper cladding 196 with liquid crystal material 198 therein; a second pair of electrodes 182,184 including a first 182 and second 184 electrode positioned along the outer edges of the channel 194; and a glass cover 200, if desired.

The substrate 187, lower cladding 190, core 192, upper cladding 196 with liquid crystal material 198 therein, and the glass cover 200 can all be made as described above with reference to FIGS. 1-7 and FIGS. 11-12. The liquid crystal material 198 for the example of FIG. 13 may be aligned such that for zero or low voltages 202 the molecules lay down in the plane of the waveguide 180 with an out-of-plane tilt angle that is approximately zero or a small value and are oriented with their longitudinal axes parallel to the waveguide channel 194 (i.e., parallel to the light 66 propagation direction) with an in-plane angle that is approximately zero or generally small. The upper electrode 186 of the first pair of electrodes 186, 188, and side electrodes 182, 184 of the second pair of electrodes 182,184—can be implemented as a conductive coating that may then be patterned via photolithography or by other means.

The first 186,188 and second 182,184 electrode pairs can provide for different control over different polarizations. For example, the second electrode pair 182,184 along the core channel 192 may be oriented such that only TE polarized light will have its indices altered with voltage 202 (see FIGS. 11-12) and the first electrode pair 186,188 may be oriented such that only TM polarized light will have its index altered with voltage 203 (see FIGS. 5-7). In other words, in one example, with the same liquid crystal alignment or orientation for the liquid crystal material 198 adjacent to both electrode pairs (186,188 and 182,184), this structure can provide independent TE and TM control by applying voltage 203 to the first pair 186,188 of electrodes (and not the second pair 182,184) to control TM, and then applying voltage 202 to the second pair 182,184 of electrodes (and not the first pair 186, 188) to control TE. In this configuration, the liquid crystal molecules 198 are initially aligned so that when no voltage 202,203 is applied to either pair of electrodes (186,188 and 182,184) the longitudinal axes of the molecules are aligned substantially parallel to the plane of the waveguide 180 and substantially parallel to the direction of light 204 propagation, i.e., the out-of-plane tilt angle and the in-plane rotation angle are both generally small.

Each pair of electrodes (186,188 and 182,184) may be coupled with separate voltage sources (202,203) so that different voltages can be independently applied to the first 186, 188 and second 182,184 pairs of electrodes.

As voltage 202 is applied to the second electrode pair 182,184 (and not to the first pair of electrodes 186,188) and is increased, the effective index for TE polarized light will increase and the effective index for TM polarized light will remain unchanged. As voltage 203 is applied to the first electrode pair 186,188 (and not to the second pair of electrodes 182,184) and is increased, the effective index for TM polarized light will increase and the effective index for TE polarized, light will remain unchanged. In this way, the cumulative optical phase delay may be altered for only TE light, only TM light, or any variation in between. In the case where the voltages 202,203 applied to the two electrode pairs (186, 188 and 182,184) is such that the TE optical phase delay is always equivalent to the TM optical phase delay, then the device is rendered polarization independent since any arbitrary input polarization may be expressed as a linear combination of TE and TM polarized light.

As with the other embodiments disclosed herein that use liquid crystal waveguides to control the index of refraction for TE polarized light, TM polarized light, either simultaneously or independently, the embodiment of FIG. 13 can be made using different arrangements, liquid crystal alignments, or orders of layers as desired. For example, while FIG. 13 depicts the two electrode pairs (186,188 and 182,184) as segregated to different regions of the waveguide 180, the two electrode pairs (186,188 and 182,184) could be overlapped, either partially or completely. Any two electrode pairs that provide for different TE vs. TM control may be used.

Figure 14A:
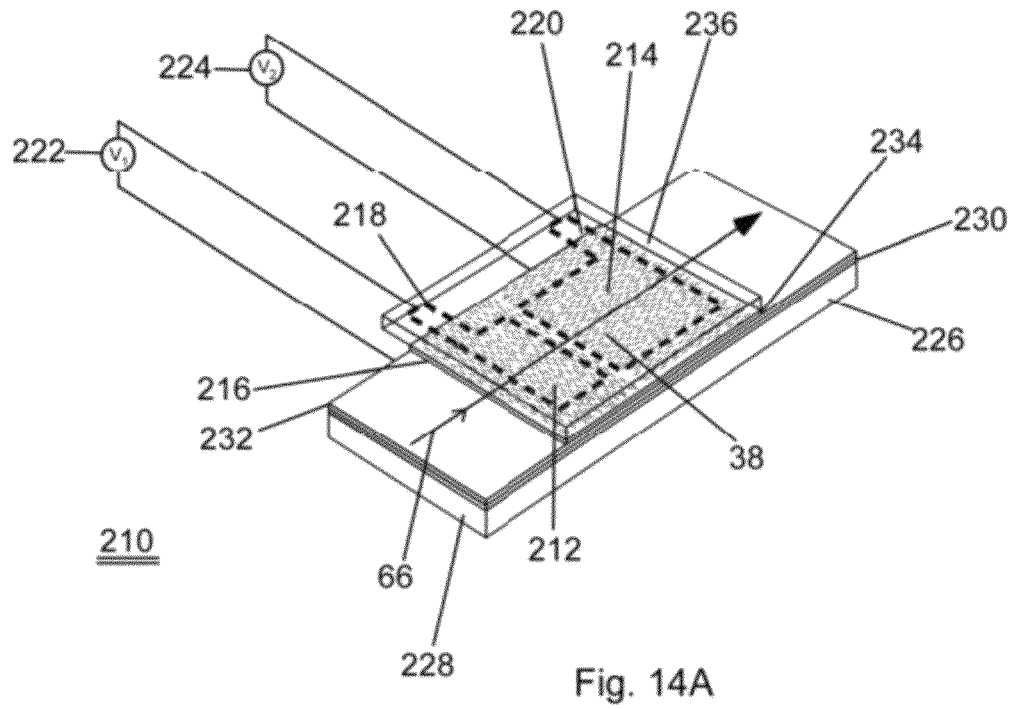
FIGS. 14A-B illustrate an example of a waveguide having two regions of differing liquid crystal alignment for simultaneous and/or independent control of light propagation over both TE and TM polarizations of light, in accordance with an embodiment of the present invention.
Figure 14B:
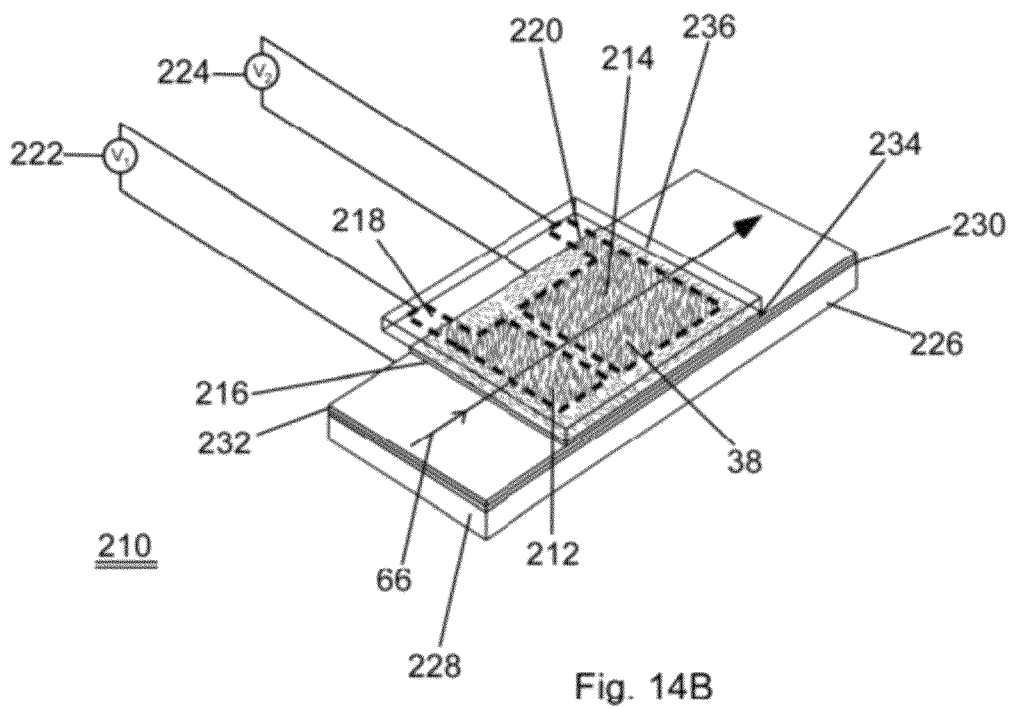

FIGS. 14A-B illustrate another embodiment wherein the waveguide 210 utilizes an alignment layer having two or more areas or regions 212,214 having different orientations in the adjacent cladding 216, in accordance with one embodiment of the present invention. In one example, a waveguide 210 can be constructed in a manner similar to the embodiments described above except that the embodiments of FIGS. 14A-B have an alignment layer with two or more regions of alignment 212,214, and the upper electrode may be divided into at least two electrodes 218,220 to independently control the different alignment regions 212,214 through different voltage sources 222,224 if desired.

Hence, the waveguide of the example of FIGS. 14A-B may include at least a first and second upper electrode 218,220; a substrate 226 acting as a lower electrode plane 228; a lower cladding 230; a core layer 232; an alignment layer having one or more regions 212,214 of differing alignments; an upper cladding 216 with liquid crystal material 234 therein; and a glass cover 236, if desired. The substrate 226, lower cladding 239, core 232, upper cladding 216 with liquid crystal material 234 therein, and the glass cover 236 can be made as described above with reference to FIGS. 1-7. The upper electrodes 218,220 can be implemented as a conductive coating that may then be patterned via photolithography or by other means.

On the alignment layer, the two or more areas or regions 212,214 of differing alignment orientations can provide for different control over different polarizations. For example, the first region 212 may initially bias liquid crystals 234 into an alignment such that both TE and TM polarized light will have their indices altered as voltage 222 is applied (see FIGS. 2-4), and the second region 214 may initially bias liquid crystals 234 into an alignment that only TM polarized light will have its index altered with voltage 224 (see FIGS. 5-7). In this example, a first region 212 may contain liquid crystal material 234 that is aligned perpendicular to the light 66 propagation with an in-plane angle of approximately ninety degrees and a second region 214 may contain liquid crystal material 234 that is aligned parallel to the light 66 propagation with an in-plane angle of approximately zero degrees.

In the first region 212, as voltage 222 is increased, the effective index for TE polarized light will decrease and the effective index for TM polarized light will increase.

The TM index in the second region 214 may be dynamically controlled to either add to or subtract from changes in the TM index due to the first region 212. In this way one may alter the cumulative optical phase delay of only the TE index, only the TM index, or any variation in between. In the case where the voltages 222,224 applied to the two regions 212, 214 such that the TE optical phase delay is always equivalent to the TM optical phase delay, then the device can be rendered polarization independent since any arbitrary input polarization may be expressed as a linear combination of TE and TM polarized light.

As with the other embodiments disclosed herein that use liquid crystal waveguides to control the index of refraction for TE polarized light and or TM polarized light, either simultaneously or independently, the embodiment of FIGS. 14A-B can be made using different arrangements, liquid crystal alignments, or orders of layers as desired. Any two regions that provide for different TE vs. TM control may be used, and the example of liquid crystal alignment is only one example.

Figure 15:
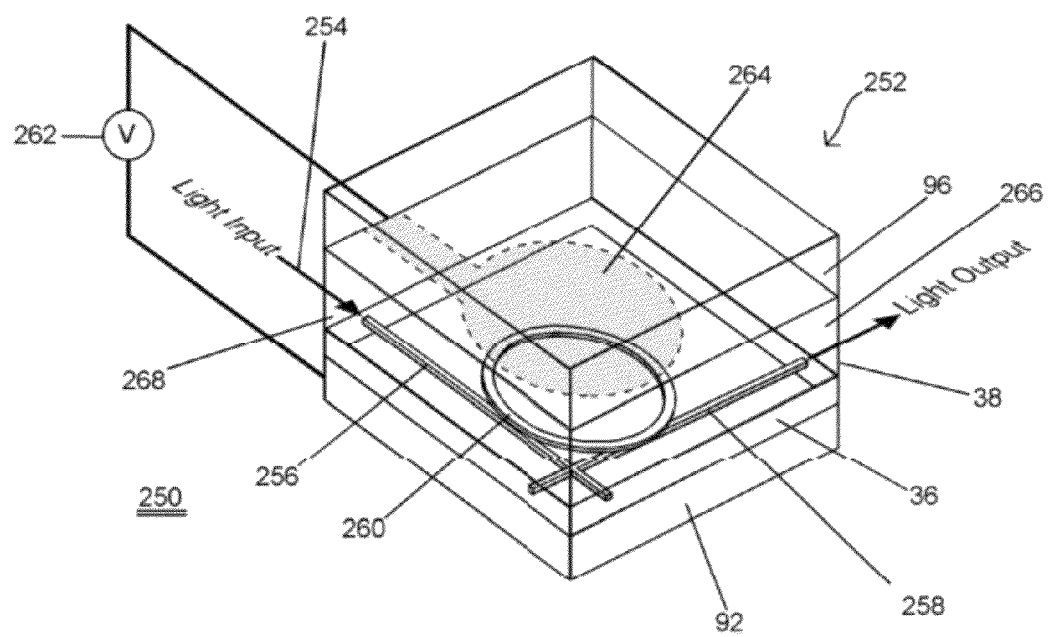
FIG. 15 illustrates an example of a ring-resonator tunable optical filter, in accordance with an embodiment of the present invention.

As explained above, embodiments of the present invention may be used in various applications. FIGS. 15-16 illustrate two examples of applications of some embodiments of the present invention. In FIG. 15, an optical ring resonator 250 is combined with a liquid crystal waveguide 252 to create a voltage tunable optical filter. Light is input 254 along one of the channel structures 256, which passes near a waveguide ring structure 260 such that the evanescent tail of the input channel 256 light 254 protrudes into the ring structure 260. If the optical path length of the ring 260 is such that it is near an integral number of wavelengths of light 254, then light 254 can be coupled through the ring 260 and into the output channel 258. By applying a voltage 262 to an electrode 264 placed above the ring 260, the total optical path length of the ring 260 may be voltage 262 tuned, via tuning of the liquid crystal cladding 266. In this way, the wavelength of light that is transferred from the input 256 to the output 258 channel may be controllably altered. This enables a voltage tunable optical "add drop," which is useful in telecommunications. This can also be used as a voltage tunable wavelength filter in tunable lasers.

For manufacturing simplicity, the liquid crystal 268 may be aligned along only one direction, i.e., it will not follow the curvature of the ring structure 260, since the ring 260 diameter may be only tens or hundreds of microns. Therefore, as the light propagates through the ring 260, the orientation of the liquid crystal material 268 with respect to the direction of light propagation will change. To make a device adapted for a given input polarization, such as TE or TM, a waveguide 252 could be designed so as to avoid TE-to-TM or TM-to-TE mode conversion voltages. As discussed previously and according to one embodiment of the invention, this can be accomplished by ensuring that the geometric birefringence is greater than the material birefringence for all operational voltages.

For many applications it is advantageous to provide for polarization independence wherein a device operates the same regardless of the input polarization. In one example, this can be accomplished by having two electrodes 280, 282, wherein TE and TM polarizations can be controlled differently via different voltages applied to the electrodes. For the ring-resonator geometry this is depicted in the example of FIG. 16. With a liquid crystal alignment 284 as indicated by the dark arrow on the figure, one electrode 280 will alter the optical path length of predominantly TM polarized light, whereas the other electrode 282 will alter the optical path length of both TM and TE polarized light. As discussed previously, these two electrodes 280,282 can be used to alter the optical path length of the ring for just TE polarized light, just TM polarized light, and any combination in between. If the two voltages applied to the two electrodes 280,282 are altered in a manner so that both the TE and the TM optical path lengths are altered the same amount, then the device will perform in a polarization independent manner.

FIGS. 17A-B and 18A-B illustrate different views of liquid crystal molecules in order to show out-of-plane tilt angles and in-plane angles as those terms are used herein with respect to various embodiments of the present invention.

As used in this application, the term "longitudinal axis" may refer to the long axis of a nematic liquid crystal, or any other unique axis that may be used to describe the orientation of the liquid crystal molecule. The longitudinal axis may also be referred to as the director. It is further understood that the longitudinal axes for different liquid crystal molecules may not be precisely aligned with one another, but rather encompass a distribution. Further, the distribution of orientations for the longitudinal axes may change for different regions within the liquid crystal layer. Hence, the orientation of the longitudinal axis for liquid crystal molecules and how they are altered under the application of voltages may refer to a general distribution of orientations of a plurality of molecules as well.

Figure 17A:
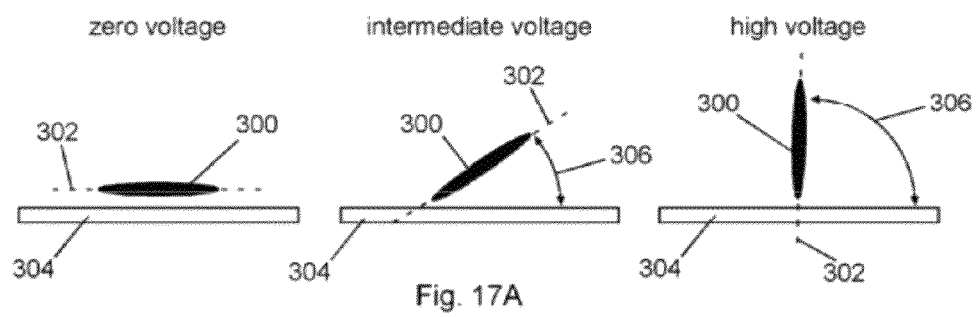
FIG. 17A illustrates an end view of an example of a liquid crystal molecule as the out-of-plane tilt between the longitudinal axis of the molecule and the plane of the waveguide increases under the application of a voltage, in accordance with one embodiment of the present invention.
Figure 17B:
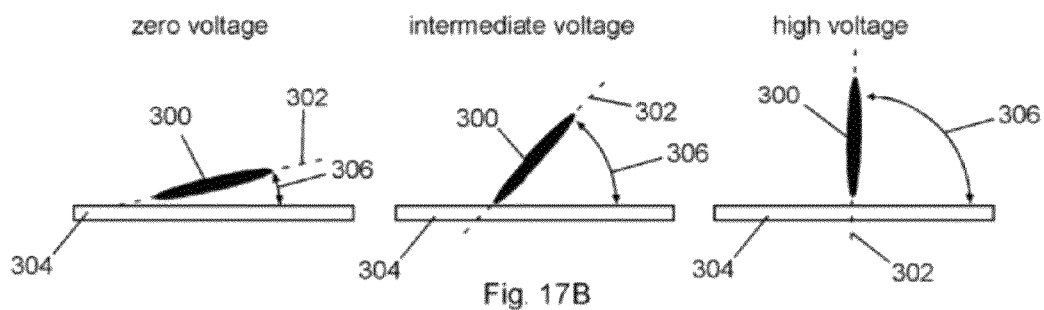
FIG. 17B illustrates an end view of an example of a liquid crystal molecule as the out-of-plane tilt between the longitudinal axis of the molecule and the plane of the waveguide increases under the application of a voltage, in accordance with one embodiment of the present invention.

FIG. 17A-B illustrate examples of out-of-plane tilt angles, wherein a liquid crystal molecule 300, which may have a longitudinal axis 302, may rotate away from the plane of the waveguide 304 under the application of voltage. The magnitude of rotation may be described by an out-of-plane tilt angle 306 between the longitudinal axis 302 of the liquid crystal molecule 300 and the plane of the waveguide 304.

Depending upon the implementation of a waveguide and as shown in FIG. 17A, the out-of-plane tilt angle 306 may increase from approximately zero degrees when no voltage is applied to a larger intermediate value as voltage is increased, and further to approximately 90 degrees when a higher voltage is applied. This rotation may occur in either a clockwise or a counter-clockwise direction.

In this example of FIG. 17A, the orientation when no voltage is applied may correspond to an initial state or an initial orientation. This out-of-plane tilt angle 306 for the initial state may be referred to as a pre-tilt angle, which in this example may be approximately zero degrees. Furthermore, by controllably altering the magnitude of the intermediate voltage the magnitude of the out-of-plane tilt angle 306 may be controllably altered.

Alternatively, as shown in FIG. 17B the out-of-plane tilt angle 306 may increase from a smaller value when no voltage is applied, to a larger intermediate value as voltage is increased, and further to approximately 90 degrees when a higher voltage is applied. This rotation may occur in either a clockwise or counter-clockwise direction.

In this example of FIG. 17B, the orientation when no voltage is applied may correspond to an initial state or an initial orientation. This out-of-plane tilt angle 306 for the initial state may be referred to as a pre-tilt angle, which in this example may be approximately greater than zero degrees.

Figure 18A:
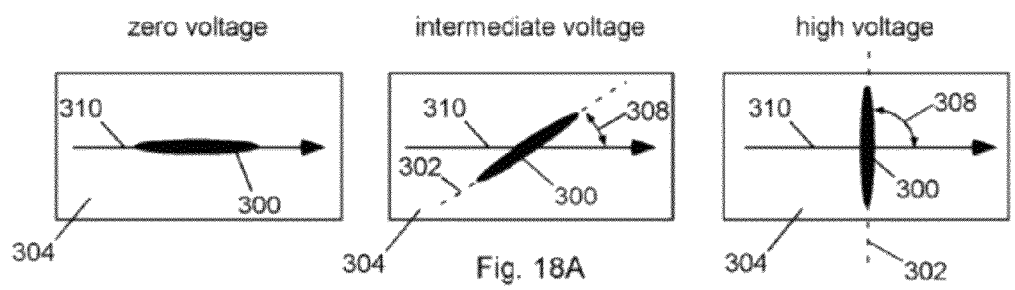
FIG. 18A illustrates a top view of an example of a liquid crystal molecule as the in-plane angle between the longitudinal axis of the molecule and the light propagation direction increases under the application of a voltage, in accordance with one embodiment of the present invention.
Figure 18B:
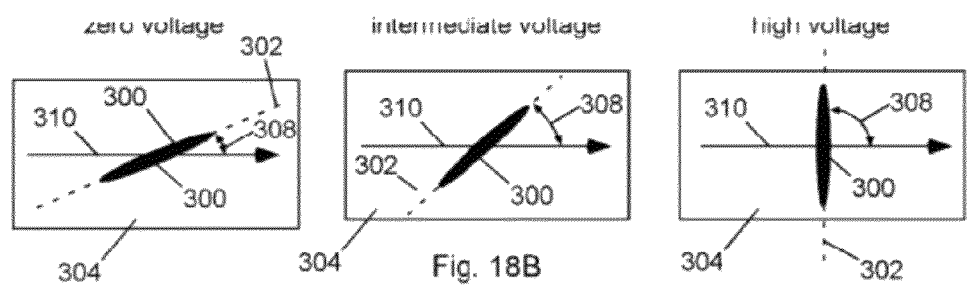
FIG. 18B illustrates a top view of an example of a liquid crystal molecule as the in-plane angle between the longitudinal axis of the molecule and the light propagation direction increases under the application of a voltage, in accordance with one embodiment of the present invention.

FIG. 18A and FIG. 18B illustrate examples of in-plane angles, wherein a liquid crystal molecules 300, which may have a longitudinal axis 302, may rotate within the plane of the waveguide 304 under the application of voltage. The in-plane angle 308 may be characterized as the angle between the longitudinal axis of the molecule (or director) and the light propagation direction/vector. When viewed from the top as in FIGS. 18A-B down onto the plane of the waveguide 304, the longitudinal axis 302 of the liquid crystal molecule 300 may be oriented at an in-plane angle 308 with respect to the direction of light propagation 310.

Depending on the implementation of a waveguide and as shown in FIG. 18A, the in-plane angle 308 may increase from approximately zero degrees when no voltage is applied, to a larger intermediate value as voltage is increased, and further to approximately 90 degrees when a higher voltage is applied. This rotation may occur in either a clockwise or a counter-clockwise direction. In this example, the orientation when no voltage is applied may correspond to an initial state or an initial orientation. In one example, the in-plane angle 308 for the initial state may be substantially parallel or perpendicular to the direction of the light propagation, as is shown in FIG. 18A.

Alternatively, as shown in FIG. 18B the orientation when no voltage is applied may correspond to an initial state or an initial orientation. The in-plane angle 308 for the initial state may be at an in-plane angle that is neither parallel to nor perpendicular to the direction of the light propagation, as is shown in FIG. 18B.

While FIGS. 17A-B and 18A-B illustrate examples wherein the longitudinal axis of the liquid crystal molecules rotates to align with the direction of the applied electric field, it is understood that liquid crystal material that rotates perpendicular to the applied electric field could be used. For example, a liquid crystal material with a negative dielectric anisotropy, rather than a positive dielectric anisotropy, could be utilized.

In terms of out-of-plane tilt angles and in-plane angles, in FIGS. 2A-B, 3A-B and 4A-B, the out-of-plane tilt angle of the liquid crystal molecules 38 changes from an initial orientation of small/approximately zero degrees to, as voltage 46 is applied across the electrodes 42, 44, another orientation of approximately ninety degrees. The in-plane angle of the liquid crystal molecules 38 has an initial orientation of approximately ninety degrees and remains substantially unchanged as voltage 46 is applied across the electrodes 42, 44.

In FIGS. 5A-B, 6A-B and 7A-B, the out-of-plane tilt angle of the liquid crystal molecules 38 changes from an initial orientation of small/approximately zero degrees to, as voltage 46 is applied across the electrodes 42, 44, another orientation of approximately ninety degrees. The in-plane angle of the liquid crystal molecules 38 has an initial orientation of approximately zero degrees and remains substantially unchanged as voltage 46 is applied across the electrodes 42, 44.

In FIGS. 11A-B and 12A-B, the in-plane angle of the liquid crystal molecules 38 in between the electrodes 138, 140 changes from an initial orientation of approximately zero degrees to, as voltage 142 is applied across the electrodes 138, 140, another orientation of approximately ninety degrees. The out-of-plane tilt angle of the liquid crystal molecules 38 between the electrodes 138, 140 has an initial orientation of approximately zero degrees and remains substantially unchanged as voltage 142 is applied across the electrodes 138, 140.

In FIGS. 14A-B, two regions 212, 214 of liquid crystal molecules are provided in a single waveguide 210. For the first region 212, the out-of-plane tilt angle of the liquid crystal molecules 38 changes from an initial orientation of small/approximately zero degrees to, as voltage 222 is applied across the electrodes 218, 228, another orientation of approximately ninety degrees. The in-plane angle of the liquid crystal molecules 38 has an initial orientation of approximately ninety degrees and remains substantially unchanged as voltage 222 is applied across the electrodes 218, 228.

For the second region 214, the out-of-plane tilt angle of the liquid crystal molecules 38 changes from an initial orientation of small/approximately zero degrees to, as voltage 224 is applied across the electrodes 220, 228, another orientation of approximately ninety degrees. The in-plane angle of the liquid crystal molecules 38 has an initial orientation of approximately zero degrees and remains substantially unchanged as voltage 224 is applied across the electrodes 220, 228.

Light 66 may be introduced into a waveguide via a variety of techniques. In one example, a high index prism constructed from a material such as GGG, rutile, Si, or any other suitably high index material can be pressed against a waveguide and used as a prism coupler. In another embodiment, suitably high numerical aperture lenses, such as cylindrical microlenses, ball lenses or others, may be used to focus light into a waveguide via an endfire coupling scheme. In another example, a light source may be either a fiber optic cable or another waveguide, which in turn may be placed directly against a liquid crystal waveguide for the purpose of introducing light via a butt-coupling technique. Furthermore, the entrance into and/or exit from a waveguide may be modified to facilitate coupling light into and out of a waveguide, for example, the core and/or cladding dimensions and/or indices may be tapered or altered in the region near the entrance or exit of a waveguide, or integrated optical lenses may be utilized.

Embodiments of the present invention may be utilized to make or may be incorporated as part of various devices, such as but not limited to tunable lasers, spectrometers, Fourier transform spectrometers, optical filters, optical time delays, optical switches, telecommunications system, dynamically tunable filters, adjustable delay lines, tunable resonators, continuously tunable lasers.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that references throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A waveguide for controllably altering the optical path length of TE light traveling through the waveguide along a propagation direction, comprising:
   a core for guiding the TE light through the waveguide;
   at least one cladding having liquid crystal molecules disposed therein, the liquid crystal molecules having longitudinal axes, the at least one cladding adjacent the core;
   an alignment layer adjacent to the at least one cladding, the alignment layer initially aligning at least a portion of the liquid crystal molecules in an initial orientation with their longitudinal axes oriented at an out-of-plane tilt angle of 0 to 90 degrees, and their longitudinal axes oriented at an in-plane angle in the range of approximately 5 to 90 degrees measured relative to the propagation direction; and
   a pair of electrodes for receiving a voltage for creating an electric field between the electrodes and through the at least on cladding, the electric field being oriented substantially perpendicular to the propagation direction of the TE light traveling through the waveguide;
   wherein as the voltage is applied to the pair of electrodes, alignment of the liquid crystals changes so the optical phase delay changes for the TE light traveling through the waveguide;
   wherein thickness of the core is sized such that geometric birefringence is sufficiently high at voltages between 0 and 200 volts such that an index of refraction for the TE light is larger than an index of refraction for TM polarized light to avoid TE to TM conversion.

2. The waveguide of claim 1, wherein the core has an index of refraction greater than approximately 1.55.

3. The waveguide of claim 1, wherein the core includes tantalum pentoxide material.

4. The waveguide of claim 1, wherein the at least one cladding includes an upper cladding and a lower cladding, the upper and lower claddings positioned about the core.

5. The waveguide of claim 1, wherein the pair of electrodes includes a first electrode adjacent to the cladding and a ground plane, and wherein the voltage is applied across the first electrode and the ground plane.

6. A waveguide for controllably altering the optical path length of TE light traveling through the waveguide along a propagation direction, comprising:
- a core for guiding the TE light through the waveguide;
- at least one cladding having liquid crystals molecules disposed therein, the liquid crystal molecules having longitudinal axes;
- an alignment layer adjacent to the at least one cladding, the alignment layer initially aligning at least a portion of the liquid crystal molecules in an initial orientation; and
- a pair of electrodes positioned about the core, the pair of electrodes for receiving a control signal for creating an electric field between the electrodes;
- wherein as the control signal is applied to the pair of electrodes, alignment of the liquid crystals changes to a second orientation in order to alter the optical phase delay for the TE light traveling through the waveguide, the second orientation characterized by at least a portion of the liquid crystal molecules aligned with their longitudinal axes oriented at an angle of 0 to 90 degrees relative to a plane of the waveguide, and with their longitudinal axis oriented at an angle in the range of approximately 5 to 90 degrees measured relative to the propagation direction;
- wherein thickness of the core is sized such that geometric birefringence is sufficiently high at voltages between 0 and 200 volts such that an index of refraction for the TE light is larger than an index of refraction for TM polarized light to avoid TE to TM conversion.

7. The waveguide of claim 6, further comprising TM polarized light traveling through the waveguide along the propagation direction; and
- wherein as the control signal is applied to the pair of electrodes, the optical phase delay changes for the TM polarized light traveling through the waveguide.

8. The waveguide of claim 7, wherein the optical phase delay for the TE polarized light is greater than the optical phase delay for the TM polarized light.

9. The waveguide of claim 6, further comprising TM polarized light traveling through the waveguide along the propagation direction; and
- wherein as the control signal is applied to the pair of electrodes, the optical phase delay increases for the TM polarized light traveling through the waveguide and simultaneously the optical phase delay of the TE polarized light traveling through the waveguide decreases.

10. The waveguide of claim 6, further comprising TM polarized light traveling through the waveguide along the propagation direction; and
- wherein as the control signal is applied to the pair of electrodes, the optical phase delay decrease for the TM polarized light traveling through the waveguide and simultaneously the optical phase delay of the TE polarized light traveling through the waveguide increases.

11. The waveguide of claim 6, wherein the electric field is oriented substantially perpendicular to the propagation direction of the TE light traveling through the waveguide.

* * * * *